(12) United States Patent
Xiong et al.

(10) Patent No.: US 11,611,996 B2
(45) Date of Patent: Mar. 21, 2023

(54) METHOD FOR GRANT FREE UPLINK TRANSMISSION, USER EQUIPMENT AND BASE STATION DEVICE

(71) Applicant: Samsung Electronics Co., Ltd., Suwon-si (KR)

(72) Inventors: Qi Xiong, Beijing (CN); Bin Yu, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/052,959

(22) PCT Filed: Apr. 29, 2019

(86) PCT No.: PCT/KR2019/005119
§ 371 (c)(1),
(2) Date: Nov. 4, 2020

(87) PCT Pub. No.: WO2019/216586
PCT Pub. Date: Nov. 14, 2019

(65) Prior Publication Data
US 2021/0136827 A1 May 6, 2021

(30) Foreign Application Priority Data

May 10, 2018 (CN) .......................... 201810444554.9
May 18, 2018 (CN) .......................... 201810481214.3
Dec. 29, 2018 (CN) .......................... 201811642884.5

(51) Int. Cl.
*H04W 74/08* (2009.01)
*H04W 56/00* (2009.01)
*H04W 74/00* (2009.01)

(52) U.S. Cl.
CPC ...... *H04W 74/0833* (2013.01); *H04W 56/001* (2013.01); *H04W 74/004* (2013.01); *H04W 74/006* (2013.01)

(58) Field of Classification Search
None
See application file for complete search history.

(56) References Cited

U.S. PATENT DOCUMENTS

2017/0288817 A1* 10/2017 Cao .................... H04L 1/0079
2018/0110074 A1* 4/2018 Akkarakaran .... H04W 74/0833
(Continued)

FOREIGN PATENT DOCUMENTS

WO 2017/167198 A1 10/2017

OTHER PUBLICATIONS

NEC, 'Remaining issues on UL transmission without grant', R1-1718230, 3GPP TSG-RAN WG1 Meeting #90bis, Prague, Czech Republic, Oct. 2, 2017.
(Continued)

*Primary Examiner* — Faiyazkhan Ghafoerkhan
(74) *Attorney, Agent, or Firm* — Jefferson IP Law, LLP

(57) ABSTRACT

The present disclosure provides a grant free uplink transmission method, the method is performed at a user equipment side, comprising: determining, according to configuration information for grant free uplink transmission received from a base station, a radio network temporary identifier GF-RNTI for grant free uplink transmission, and transmitting an uplink signal; and monitoring feedback from the base station in a downlink control channel by using the determined GF-RNTI. The present disclosure also provides a user equipment and a base station for grant free uplink transmission.

12 Claims, 15 Drawing Sheets

(56) References Cited

U.S. PATENT DOCUMENTS

| | | | |
|---|---|---|---|
| 2018/0110075 A1* | 4/2018 | Ly | H04W 74/0833 |
| 2018/0205516 A1* | 7/2018 | Jung | H04W 74/0833 |
| 2018/0220423 A1* | 8/2018 | Ly | H04L 5/0098 |
| 2018/0270859 A1* | 9/2018 | Fan | H04W 72/0446 |
| 2018/0324865 A1* | 11/2018 | Hui | H04W 74/004 |
| 2018/0367255 A1* | 12/2018 | Jeon | H04L 5/0053 |
| 2018/0368157 A1* | 12/2018 | Jeon | H04L 5/0094 |
| 2018/0368174 A1* | 12/2018 | Jeon | H04W 72/0446 |
| 2018/0368175 A1* | 12/2018 | Jeon | H04W 72/04 |
| 2019/0075598 A1* | 3/2019 | Li | H04W 74/04 |
| 2019/0104507 A1* | 4/2019 | Majmundar | H04W 36/06 |
| 2019/0208550 A1* | 7/2019 | Ko | H04L 5/0053 |
| 2019/0306862 A1* | 10/2019 | Ly | H04W 72/0453 |
| 2019/0342874 A1* | 11/2019 | Davydov | H04W 72/0413 |
| 2019/0342912 A1* | 11/2019 | Priyanto | H04W 74/006 |
| 2019/0380156 A1* | 12/2019 | Akkarakaran | H04W 74/0833 |
| 2020/0178293 A1* | 6/2020 | Jeons | H04W 72/0446 |
| 2020/0196356 A1* | 6/2020 | Ko | H04L 5/0053 |
| 2020/0221503 A1* | 7/2020 | Kusashima | H04W 74/0833 |
| 2020/0351020 A1* | 11/2020 | Jeon | H04W 72/14 |
| 2020/0351912 A1* | 11/2020 | Jeon | H04W 72/044 |
| 2021/0037576 A1* | 2/2021 | Shao | H04L 1/189 |
| 2021/0075574 A1* | 3/2021 | Jung | H04L 5/0051 |
| 2021/0083828 A1* | 3/2021 | Matsuda | H04L 5/0092 |
| 2021/0136827 A1* | 5/2021 | Xiong | H04L 5/0044 |
| 2021/0204316 A1* | 7/2021 | Ye | H04W 74/0833 |
| 2021/0259025 A1* | 8/2021 | Akkarakaran | H04W 74/0833 |
| 2021/0307072 A1* | 9/2021 | Kusashima | H04W 74/0816 |
| 2021/0352734 A1* | 11/2021 | Svedman | H04W 72/1263 |

OTHER PUBLICATIONS

Huawei et al., 'Configuration on Type 1 Grant-Free for Active UE', R2-1711430, 3GPP TSG-RAN WG2 Meeting #99bis, Prague, Czech Republic, Sep. 29, 2017.

Nokia et al., 'UL transmission procedure without grant', R1-1714011, 3GPP TSG-RAN WG1 Meeting #90, Prague, Czech Republic, Aug. 11, 2017.

Samsung, 'Procedure for UL transmissions without Grant', R1-1716013, 3GPP TSG RAN WG1 Meeting NR#3, Nagoya, Japan, Sep. 12, 2017.

Convida Wireless: "Service Differentiated Random Access", 3GPP Draft; R2-1705662 (Service Differentiated Random Access), 3rd Generation Partnership Project (3GPP), Mobile Competence Centre; 650, Route Des Lucioles ; F-06921 Sophia-Antipolis Cedex ; France, vol. RAN WG2, no. Hangzhou, China; May 15, 2017-May 19, 2017, May 14, 2017, XP051275976.

ZTE et al: "Remaining details of RACH procedure", 3GPP Draft; R1-1719346, 3rd Generation Partnership Project (3GPP), Mobile Competence Centre ; 650, Route Des Lucioles ; F-06921 Sophia-Antipolis Cedex; France, vol. RAN WGI, no. Reno, USA; Nov. 27, 2017-Dec. 1, 2017 18 Nov. 18, 2017, XP051369275.

Sony: "2-step RACH to 4-step RACH fallback", 3GPP Draft; R2-1700137 2-4-Step-Fallback, 3rd Generation Partnership Project (3GPP), Mobile Competence Centre; 650, Route Des Lucioles ; F-06921 Sophia-Antipolis Cedex ; France, vol. RAN WG2, no. Spokane, USA; Jan. 17, 2017-Jan. 19, 2017, Jan. 17, 2017, XP051210722.

Extended European Search Report dated May 12, 2021, issued in European Patent Application No. 19798993.2.

* cited by examiner (a)

(b)

(c)

METHOD FOR GRANT FREE UPLINK TRANSMISSION, USER EQUIPMENT AND BASE STATION DEVICE

TECHNICAL FIELD

The present disclosure relates to the field of wireless communication systems, and in particular, to a method for grant free uplink transmission, a user equipment and a base station device.

BACKGROUND ART

With the rapid development of the information industry, especially the growing demand from the mobile internet and Internet of Things (IoTs), it brings unprecedented challenges to future mobile communication technologies. According to a report ITU-R M.[IMT.BEYOND 2020.TRAFFIC] of the International Telecommunication Union (ITU), it can be expected that by 2020, the growth of mobile traffic will increase by nearly 1000 times compared with 2010 (4G era), and user equipment connections will also exceed 17 billion; with the massive penetration of IoT devices into mobile communication networks, the number of connected devices will be even more astonishing. In order to cope with this unprecedented challenge, the communication industry and academia have launched a wide range of fifth-generation (5G) mobile communication technology research for the 2020s. The framework and overall goals of the future 5G have been recently discussed in the ITU Report ITU-R M.[IMT.VISION], which details 5G requirement expectations, application scenarios and key performance indicators. For the new requirements in 5G, the ITU report ITU-R M.[IMT-.FUTURE TECHNOLOGY TRENDS] provides information on 5G technology trends, aiming at resolving a significant increase in system throughput, user experience consistency, scalability to support IoTs, latency, energy efficiency, cost, network flexibility, emerging services, flexible spectrum utilization and so on.

Faced with 5G's more diverse service scenarios, flexible multiple access technologies are needed to support different scenarios and service requirements. For example, in facing a massively connected service scenario, how to access more users on a limited resource becomes a core issue that needs to be solved by 5G multiple access technology. In the current 4G LTE network, the Orthogonal Frequency Division Multiplexing (OFDM) based multiple access technology is mainly used. However, it is obviously difficult for the existing orthogonal-based access method to meet the requirements for 5G with spectrum efficiency increased by 5~15 times and the number of user access per square kilometer area reaching million levels. Non-orthogonal Multiple Access (NoMA) technology reuses the same resources by multiple users, which greatly increases the number of supported user connections. As the user has more opportunities to access, the overall network throughput and spectrum efficiency are improved. In addition, in facing massive Machine Type Communication (mMTC) scenarios, it may be necessary to use a multiple access technology that is easier to handle, in consideration of the cost and implementation complexity of the terminal. Faced with low-latency or low-power service scenarios, the usage of non-orthogonal multiple access technology can better achieve grant free contention access, achieve low-latency communication, and reduce turn-on time and device power consumption.

The non-orthogonal multiple access technology currently under study is Multiple User Shared Access (MUSA), Non-Orthogonal Multiple Access (NOMA), Pattern Division Multiple Access (PDMA), Sparse Code Multiple Access (SCMA) and Interleave Division Multiple Access (IDMA) and the like. Among them, MUSA relies on codewords to distinguish users. SCMA relies on codebooks to distinguish users. NOMA distinguishes users by power. PDMA distinguishes users by different feature patterns, and IDMA distinguishes users by interleaving sequences.

DISCLOSURE OF INVENTION

Technical Problem

When a user (UE, User Equipment) is in the connected state, that is, the UE has accessed the network to obtain the cell-radio network temporary identity (C-RNTI) configured by the network device, the user can detect whether the received downlink control information is for itself or not based on the C-RNTI. However, when the UE is in the non-connected state, especially when the UE performs the grant free uplink transmission, how to determine the time-frequency resource of the grant free uplink transmission or using what kind of identifier to check whether the downlink control channel information belongs to itself is a problem that needs to be solved.

Solution to Problem

In view of this, according to an aspect, the present disclosure provides a grant free uplink transmission method performed at a user equipment side, comprising: determining, according to configuration information for grant free uplink transmission received from a base station, a radio network temporary identifier GF-RNTI for grant free uplink transmission, and transmitting an uplink signal; and monitoring feedback from the base station in a downlink control channel by using the determined GF-RNTI.

According to an embodiment of the present disclosure, the method further comprises determining first information according to the configuration information for grant free uplink transmission received from the base station, the first information comprising at least one of a time-frequency resource, preamble, a de-modulation reference signal DMRS, or a multiple access signature MAS for grant free uplink transmission.

According to an embodiment of the present disclosure, the configuration information comprises at least one of a grant free uplink transmission time-frequency resource set; a mapping relationship between a grant free uplink transmission time-frequency resource and a downlink beam; and a mapping relationship between at least one of a grant free preamble, a DMRS or a multiple access signature resource and a downlink beam; a resource pool of GF-RNTI; a mapping relationship between GF-RNTI and at least one of a time-frequency resource, a preamble, a DMRS, or a multiple access signature resource for grant free uplink transmission; a control resource set for UE to monitor a grant free uplink transmission feedback and/or configuration of search space; the maximum number of transmissions of the grant free uplink transmission; and the maximum transmission time of the grant free uplink transmission.

According to an embodiment of the present disclosure, determining the GF-RNTI for grant free uplink transmission comprises at least one of: determining, according to the configuration information, a GF-RNTI resource pool, selecting one GF-RNTI from the GF-RNTI resource pool as a GF-RNTI for grant free uplink transmission; determining, according to the first information, the GF-RNTI for grant free uplink transmission; and when the grant free uplink transmission time-frequency resource is determined based on the configured random access time-frequency resource, calculating the radio network temporary identifier RA-RNTI on a corresponding random access channel as the GF-RNTI.

According to an embodiment of the present disclosure, determining, according to the first information, the GF-RNTI for grant free uplink transmission comprises at least one of: determining, according to the determined first information and a mapping relationship between the GF-RNTI and the first information, the GF-RNTI for grant free uplink transmission; and calculating the GF-RNTI for grant free uplink transmission according to the first information.

According to an embodiment of the present disclosure, calculating the GF-RNTI for grant free uplink transmission according to the first information comprises: calculating the GF-RNTI for grant free uplink transmission according to at least one of an index of a grant free uplink transmission opportunity (GFO), a time unit index, an orthogonal frequency division multiplexing (OFDM) symbol index, a subframe index, or a carrier index where the determined grant free uplink transmission time-frequency resource is positioned.

According to an embodiment of the present disclosure, determining at least one of a time-frequency resource, a preamble, a de-modulation reference signal DMRS, or a multiple access signature MAS for grant free uplink transmission comprises: determining the downlink beam, and determining at least one of the time-frequency resource, the preamble, the de-modulation reference signal DMRS, and the multiple access signature MAS for grant free uplink transmission according to the determined downlink beam and the mapping relationship between the downlink beam and at least one of the time-frequency resource, the preamble, the de-modulation reference signal DMRS, and the multiple access signature MAS for grant free uplink transmission; and determining at least one of the time-frequency resource, the preamble, the de-modulation reference signal DMRS, and the multiple access signature MAS for grant free uplink transmission according to the determined GF-RNTI and the mapping relationship between the GF-RNTI and at least one of the time-frequency resource, the preamble, the de-modulation reference signal DMRS, and the multiple access signature MAS for grant free uplink transmission.

According to an embodiment of the present disclosure, the grant free uplink transmission time-frequency resource set is determined by at least one of: determining by an indication of at least one of the number of time units and a time unit start position, the number of frequency domain units and a frequency domain unit start position, and a time-frequency resource repetition period; determining by an indication of an index of the grant free uplink transmission opportunity (GFO); and determining by an indication of a relative position to the configured random access time-frequency resource.

According to an embodiment of the present disclosure, the indication of the relative position to the configured random access time-frequency resource comprises: indicating relative position information of the grant free uplink transmission time-frequency resource to the configured random access time-frequency resource in the frequency domain, relative position information in the time domain or relative position information in the code domain.

According to an embodiment of the present disclosure, indicating the relative position information in the frequency domain comprises indicating, in the configuration information, a frequency domain interval size of the grant free uplink transmission time-frequency resource and the random access resource, and indicating the number of the GFOs in the frequency domain; indicating the relative position information in the time domain comprises indicating, in the configuration information, a time interval size of the grant free uplink transmission time-frequency resource and the random access resource, and indicating the number of GFOs in the time domain; and indicating the relative position information in the code domain comprises indicating, in the configuration information, some or all of the random access resources as the grant free uplink transmission time-frequency resource and indicating a preamble index or index range used in the grant free uplink transmission.

According to an embodiment of the present disclosure, indicating the relative position information in the frequency domain is implemented by at least one of: performing frequency division on one random access opportunity RO and one grant free uplink transmission opportunity GFO, wherein a time-divided preamble and data part are respectively transmitted in one GFO; performing frequency division on a plurality of time-divided random access opportunities ROs and one grant free uplink transmission opportunity GFO, wherein a time-divided or frequency-divided preamble and data part are respectively transmitted in one GFO; and performing frequency division on one random access opportunity RO and one grant free uplink transmission opportunity GFO, wherein a frequency-divided preamble and data part are respectively transmitted in one GFO.

According to an embodiment of the present disclosure, indicating the relative position information in the time domain is implemented by at least one of: performing time division on one random access opportunity RO and one grant free uplink transmission opportunity GFO, wherein a time-divided preamble and data part are respectively transmitted in one GFO; performing time division on a plurality of frequency-divided random access opportunities ROs and one grant free uplink transmission opportunity GFO, wherein a time-divided or frequency-divided preamble and data part are respectively transmitted in one GFO; and performing time division on one random access opportunity RO and one grant free uplink transmission opportunity GFO, wherein a frequency-divided preamble and data part are respectively transmitted in one GFO.

According to an embodiment of the present disclosure, the mapping relationship between the grant free uplink transmission time-frequency resource and the downlink beam is obtained by at least one of: configuring a separate mapping relationship between the grant free uplink transmission time-frequency resource and the downlink beam; reusing the mapping relationship between the random access time-frequency resource and the downlink beam; and if the separate mapping relationship between the grant free uplink transmission time-frequency resource and the downlink beam is not configured, reusing the mapping relationship between the random access time-frequency resource and the downlink beam; otherwise, using the configured separate mapping relationship between the grant free uplink transmission time-frequency resource and the downlink beam.

According to an embodiment of the present disclosure, the mapping relationship between at least one of the grant free preamble, the DMRS or the multiple access signature resource and the downlink beam is obtained by at least one of:

configuring a separate mapping relationship between at least one of the grant free preamble, the DMRS or the multiple access signature resource and the downlink beam;

reusing the mapping relationship between the random access preamble and the downlink beam to obtain a preamble for grant free uplink transmission, and obtaining the DMRS and the multiple access signature resource for grant free uplink transmission by the mapping relationship between the preamble for grant free uplink transmission and the DMRS, the multiple access signature resource for grant free uplink transmission;

reusing the mapping relationship between the random access preamble and the downlink beam to obtain a preamble for grant free uplink transmission, and obtaining the DMRS and the multiple access signature resource for grant free uplink transmission by configuring a separate mapping relationship between the grant free preamble, the DMRS, the multiple access signature resource and the downlink beam; and if the separate mapping relationship between at least one of the grant free preamble, the DMRS and the multiple access signature resource and the downlink beam is not configured, reusing the mapping relationship between the random access preamble and the downlink beam in combination with the mapping relationship between the preamble for grant free uplink transmission and the DMRS and the multiple access signature resource; otherwise, using the configured separate mapping relationship between at least one of the grant free preamble, the DMRS and the multiple access signature resource and the downlink beam.

According to another aspect, the present disclosure further provides a grant free uplink transmission method performed at a base station device side, comprising: transmitting, to a user equipment side, configuration information for determining a radio network temporary identifier GF-RNTI for grant free uplink transmission; and detecting user's signal transmission on the configured grant free uplink transmission time-frequency resource, and performing downlink feedback on the successfully detected and decoded signal transmission, wherein the GF-RNTI corresponding to the successfully detected and decoded signal transmission is used in the downlink feedback.

According to an embodiment of the present disclosure, the configuration information comprises at least one of a grant free uplink transmission time-frequency resource set; a mapping relationship between a grant free uplink transmission time-frequency resource and a downlink beam; and a mapping relationship between at least one of a grant free preamble, a DMRS or a multiple access signature resource and a downlink beam; a resource pool of GF-RNTI; a mapping relationship between GF-RNTI and at least one of a time-frequency resource, a preamble, a DMRS, or a multiple access signature resource for grant free uplink transmission; a control resource set for UE to monitor a grant free uplink transmission feedback and/or configuration of search space; the maximum number of transmissions of the grant free uplink transmission; and the maximum transmission time of the grant free uplink transmission.

According to an embodiment of the present disclosure, the configuration information is further used to determine at least one of the time-frequency resource, the preamble, the de-modulation reference signal DMRS, and the multiple access signature MAS for grant free uplink transmission.

According to another aspect, the present disclosure further provides a user equipment for grant free uplink transmission, comprising a memory and a processor, the memory having stored thereon computer executable instructions that, when executed by the processor, perform any of the methods performed at the user equipment side described in the embodiments of the present disclosure.

According to another aspect, the present disclosure further provides a base station device for grant free uplink transmission, comprising a memory and a processor, the memory having stored thereon computer executable instructions that, when executed by the processor, perform any of the methods performed at the base station device side described in the embodiments of the present disclosure.

According to another aspect, the present disclosure further provides a computer readable medium having stored thereon computer executable instructions that, when executed, perform any of the methods described in the embodiments of the present disclosure.

In the present disclosure, the user equipment may determine, by using configuration information of the network device, resource configuration for grant free uplink transmission, such as an available time-frequency resource, and/or a preamble, and/or a de-modulation reference signal, and/or a multiple access signature resource; at the same time, the user equipment may also determine a temporary identifier used for monitoring downlink feedback from the base station device; thereby providing a complete grant free uplink transmission method for the user equipment.

Advantageous Effects of Invention

According to the present disclosure, a grant free uplink transmission method performed at a user equipment side is provided,

BRIEF DESCRIPTION OF DRAWINGS

The above and other objects, features and advantages of the present disclosure will become more apparent from the below description of the embodiments of the present disclosure by reference to the accompanying drawings in which.

MODE FOR THE INVENTION

Figure 1:
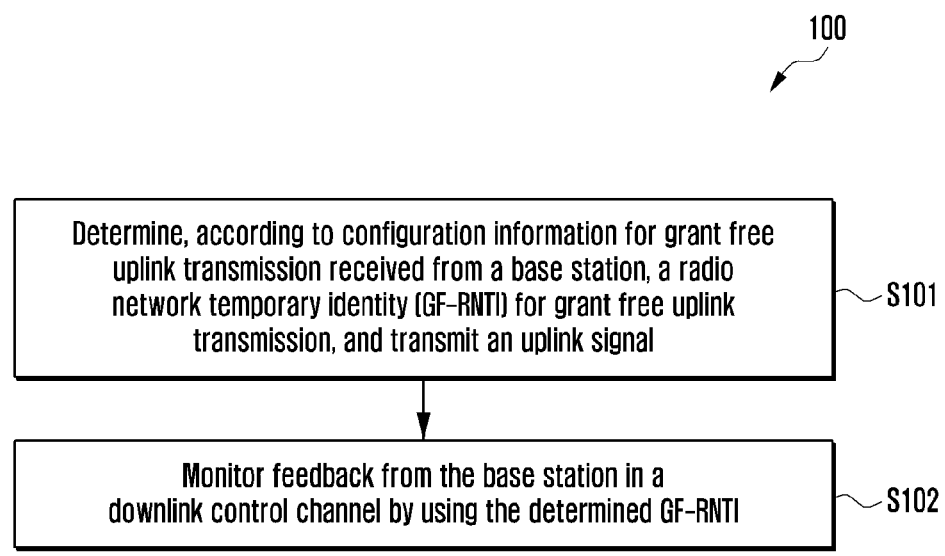
FIG. 1 is a schematic diagram of a method for grant free uplink transmission performed at a user equipment side according to an embodiment of the present disclosure.

Hereinafter, embodiments of the present disclosure will be described with reference to the drawings. It should be understood, however, that the description is only illustrative, and is not intended to limit the scope of the disclosure. In addition, descriptions of well-known structures and techniques are omitted in the following description in order to avoid unnecessarily obscuring the concept of the present disclosure.

It should be understood that the singular forms such as "a", "an" and "the" as used herein are intended to include plural forms as well, unless specifically indicated. It should be further understood that the phrases such as "comprise", "comprising", "include" or "including" as used in the description specify the existence of the stated characteristics, integers, steps, operations, elements and/or components, but do not exclude the existence or addition of one or more other characteristics, integers, steps, operations, elements, components and/or groups thereof. It will be understood that when an element is referred to as being "connected" or "coupled" to another element, it can be directly connected or coupled to the other element, or there may exist an intervening element therebetween. Further, "connected" or "coupled" as used herein may include either a wireless connection or a wireless coupling. The term "and/or" used herein includes all or any one of one or more of the associated listed items and all or any combination thereof.

Those skilled in the art will appreciate that all terms (including technical and scientific terms) used herein have the same meaning as commonly understood by one of ordinary skill in the art to which the invention belongs, unless otherwise defined. It should also be understood that terms such as those defined in a general dictionary should be understood to have meanings consistent with those in the context of the prior art, and will not be interpreted in an idealized or overly formal form unless specifically defined as here.

Those skilled in the art will appreciate that the "terminal" and "terminal device" as used herein include both a wireless signal receiver device which has only a wireless signal receiver without transmission capability, and a device having receiving and transmitting hardware which is capable of performing two-way communication over a two-way communication link. Such devices may include cellular or other communication devices having a single line display or a multi-line display or a cellular or other communication device without a multi-line display; PCS (Personal Communications Service), which may combine voice, data processing, fax, and/or data communication capabilities; PDA (Personal Digital Assistant), which may include radio frequency receivers, pagers, Internet/Intranet access, web browsers, notepads, calendars, and/or GPS (Global Positioning System) receivers; conventional laptop and/or palmtop computers or other devices having and/or including a conventional laptop and/or palmtop computer or other device that includes a radio frequency receiver. As used herein, "terminal" and "terminal device" may be portable, transportable, installed in a means of transportation (aviation, sea and/or land), or adapted and/or configured to operate locally, and/or operate on the Earth and/or in any other position of space in a distributed form. The "terminal" and "terminal device" used herein may also be a communication terminal, an internet terminal, a music/video playing terminal, such as a PDA, a MID (Mobile Internet Device), and/or a mobile phone having a music/video playback function, or may also be smart TVs, set-top boxes and other devices.

The time unit in the present disclosure may be one OFDM symbol, one OFDM symbol group (consisting of multiple OFDM symbols), one time slot, one time slot group (consisting of multiple time slots), one subframe, one subframe group (consisting of multiple subframes), one system frame, one system frame group (consisting of multiple system frames); or may be absolute time units, such as 1 millisecond, 1 second, etc.; or time units may also be a combination of multiple granularities, such as N1 time slots plus N2 OFDM symbols.

The frequency domain unit in the present disclosure may be one subcarrier, one subcarrier group (consisting of multiple subcarriers), and one resource block (RB), which may also be called a physical resource block (PRB), one resource block group (consisting of multiple RBs), one bandwidth part (BWP), one bandwidth part group (consisting of multiple BWPs), one band/carrier, one band group/carrier group; or may be absolute frequency domain units, such as 1 Hz, 1 kHz, etc.; or the frequency domain unit may also be a combination of multiple granularities, such as M1 PRBs plus M2 subcarriers.

In order to make the objects, technical means and advantages of the present disclosure more clear, the present application will be further described in detail below with reference to the accompanying drawings and specific embodiments.

FIG. 1 is a schematic diagram of a method 100 for grant free uplink transmission performed at a user equipment side according to an embodiment of the present disclosure.

The method 100 includes a step S101 of determining, according to configuration information for grant free uplink transmission received from a base station, a grant free radio network temporary identity (GF-RNTI) for grant free uplink transmission, and transmitting an uplink signal.

In this embodiment, the configuration information for grant free uplink transmission may include at least one of a grant free uplink transmission time-frequency resource set; a mapping relationship between a grant free uplink transmission time-frequency resource and a downlink beam; and a mapping relationship between at least one of a grant free preamble, a de-modulation reference signal (DMRS) or a multiple access signature (MAS) resource and a downlink beam; a resource pool of GF-RNTI; a mapping relationship between GF-RNTI and at least one of a time-frequency resource, a preamble, a DMRS, or a multiple access signature resource for grant free uplink transmission; a control resource set for UE to monitor a grant free uplink transmission feedback and/or configuration of search space; the maximum number of transmissions of the grant free uplink transmission; and the maximum transmission time of the grant free uplink transmission.

In this embodiment, according to the configuration information for grant free uplink transmission received from the base station, other configurations for the grant free uplink transmission may also be determined, including determining at least one of the time-frequency resource, the preamble, the de-modulation reference signal DMRS and a multiple access signature MAS for grant free uplink transmission.

The method further includes a step S102 of monitoring feedback from the base station in the downlink control channel by using the determined GF-RNTI, and performing a further operation according to the content of the feedback.

This embodiment provides a method for determining a GF-RNTI, which facilitates an idle user to monitor downlink feedback, and also provides a method for determining a grant free uplink transmission time-frequency resource, a grant free preamble, and the like.

Figure 2:
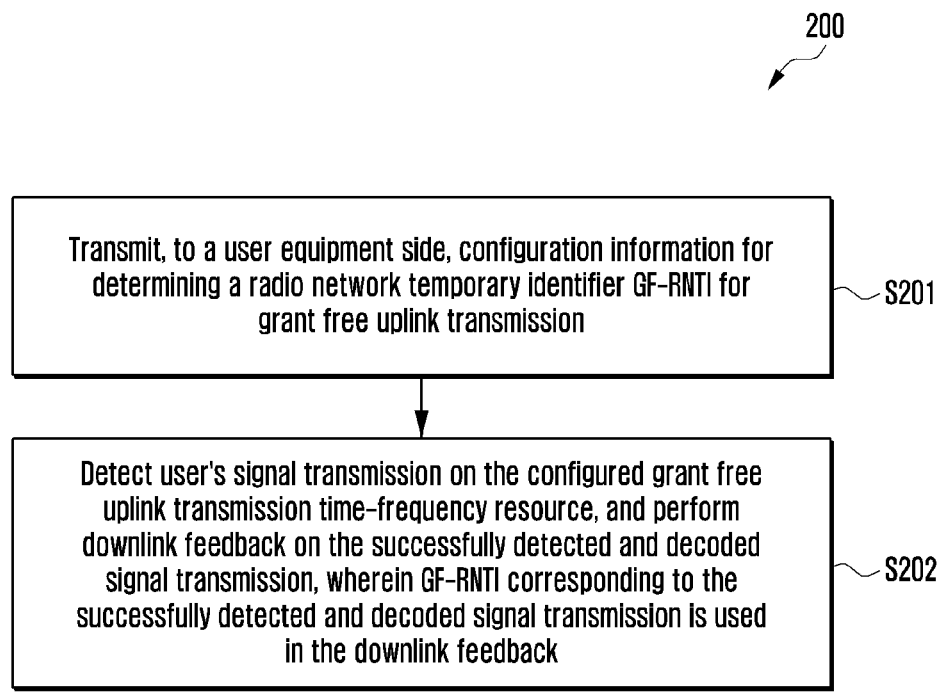
FIG. 2 is a schematic diagram of a method for grant free uplink transmission performed at a base station device side according to an embodiment of the present disclosure.

FIG. 2 is a schematic diagram of a method 200 for grant free uplink transmission performed at a base station device side according to an embodiment of the present disclosure.

The method 200 includes a step S201 of transmitting configuration information to a user equipment side, wherein a radio network temporary identifier (GF-RNTI) for grant free uplink transmission may be determined according to the configuration information; and other configuration for grant free uplink transmission may also be determined, including: determining at least one of a time-frequency resource, a preamble, a de-modulation reference signal DMRS, and a multiple access signature MAS for grant free uplink transmission.

The configuration information includes at least one of a grant free uplink transmission time-frequency resource set; a mapping relationship between a grant free uplink transmission time-frequency resource and a downlink beam; a mapping relationship between a downlink beam and at least one of a grant free preamble, a DMRS or a multiple access signature resource; a resource pool of GF-RNTI; a mapping relationship between GF-RNTI and at least one of a time-frequency resource, a preamble, a DMRS, or a multiple access signature resource for grant free uplink transmission; a control resource set for UE to monitor a grant free uplink transmission feedback and/or configuration of search space; the maximum number of transmissions of the grant free uplink transmission; and the maximum transmission time of the grant free uplink transmission.

In addition, the configuration information may further include the number of times N that the user may repeatedly transmit data when performing one grant free uplink transmission, that is, each time the UE performs the grant free uplink transmission, the UE will repeatedly transmit data N times, for example, upon each transmission, the UE repeatedly transmits data N=4 times; in some embodiments, the data may be a data part in the grant free transmission, or an entirety including a preamble and a data part; in some embodiments, the number of times N of repeated data transmission may be related to the size of the data to be transmitted by the UE or the size of the resource configured by the base station device, for example, if the transmit block size (TBS) has four types of TBS1, TBS2, TBS3, and TBS4, and TBS1<TBS2<TBS3<TBS4, the corresponding number of times of repeated data transmission may also be different, for example, there may be N1<N2<N3<N4 in one-to-one correspondence; in some embodiments, multiple TBSs may correspond to one same N value; the configuration information may include one or more thresholds, when the TBS exceeds the threshold, and/or the resource size configured by the base station device is greater than the threshold, the UE determines the corresponding N value, such as a larger N value.

The method includes a step S202 of detecting user's signal transmission on the configured grant free uplink transmission time-frequency resource, and performing downlink feedback on the successfully detected and decoded signal transmission, wherein the GF-RNTI corresponding to the successfully detected and decoded signal transmission is used in the downlink feedback.

Figure 3:
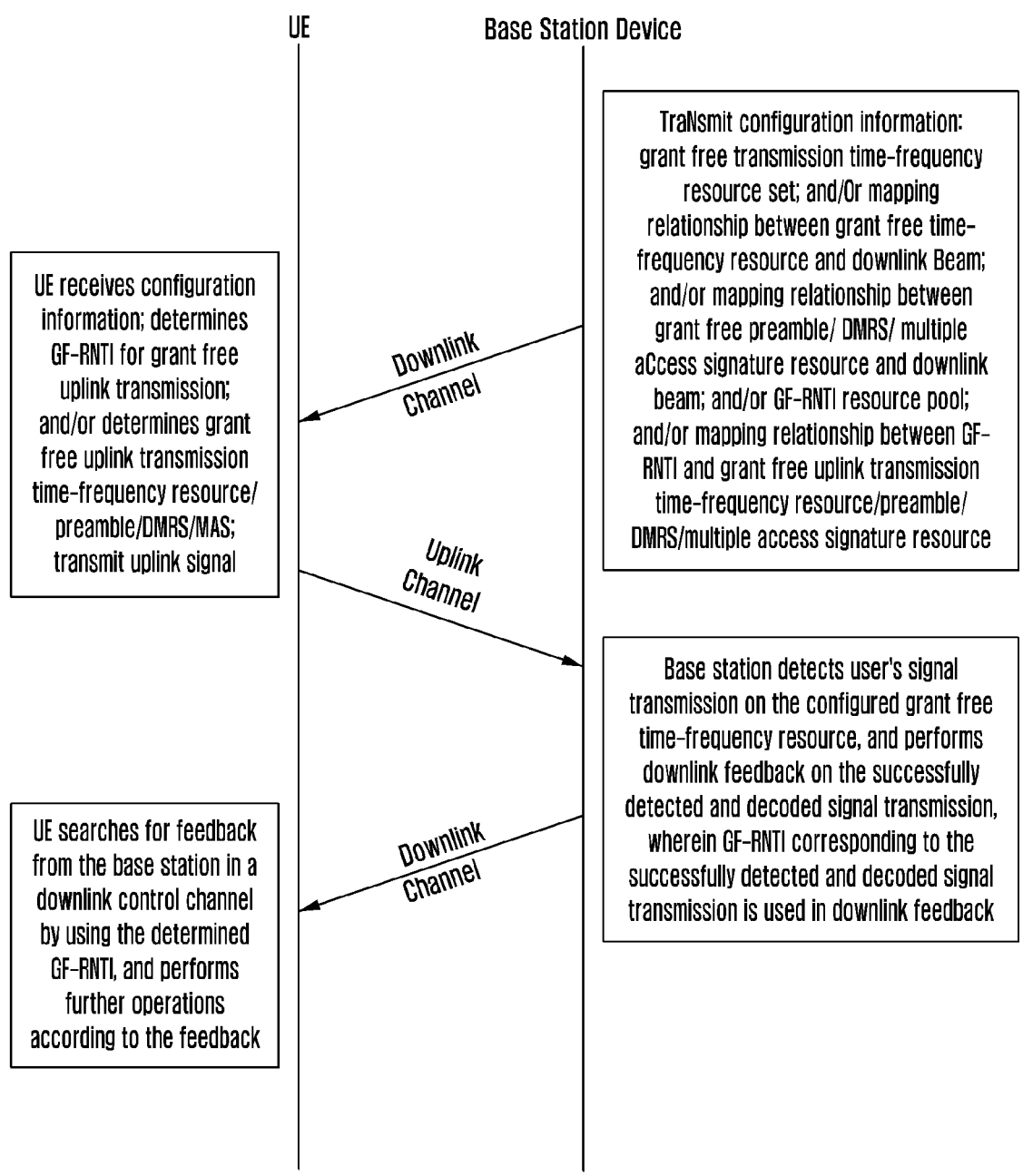
FIG. 3 is a schematic diagram of interaction between a user equipment and a base station device when performing grant free uplink transmission according to an embodiment of the present disclosure.

FIG. 3 is a schematic diagram of interaction between a user equipment and a base station device when performing grant free uplink transmission according to an embodiment of the present disclosure.

Specifically, the base station transmits the configuration information for grant free uplink transmission to the user equipment by using the downlink channel (such as the physical downlink control channel PDCCH, the physical downlink shared channel PDSCH, and the physical downlink broadcast channel PBCH). The configuration information for grant free uplink transmission includes at least one of the following (1)-(8):

(1) Time-frequency resource set for grant free uplink transmission

The time-frequency resource set may be determined by at least one of the following methods:

Explicitly indicating at least one of: the number of time units and start positions of the time units; the number of frequency domain units and start positions of the frequency domain units; time-frequency resource repetition period, for example, the configured resource is repeated every 10 ms, i.e., time-frequency resource configuration information is configured according to each time-frequency resource repetition period.

Explicitly indicating the index of the grant free transmission occasion (GFO), i.e. GFO index, one GFO is defined to transmit time-frequency resource with one or more specific transmit block sizes (TSS), and/or one or more specific MCSs, and/or one or more specific preamble formats, and/or one or more specific DMRS formats, and/or one or more specific MAS, i.e., consisting of M time units and N frequency domain units; according to different types and/or numbers of TBS, MCS, preamble format, DMRS format, and MAS, the size of the time-frequency resource represented by the corresponding GFO is different.

In some embodiments, a multi-level time unit relationship may be indicated, such as first indicating a time slot index of the grant free uplink transmission time-frequency resource, and then indicating an OFDM symbol start position of the GFO in each time slot, and the number of GFOs; the configuration of GFO in each time slot may be the same; the GFO in each time slot may be continuous, that is, only the OFDM symbol start position of the first GFO, and the number of GFOs in one time slot may be notified to infer the positions of other GFOs in this time slot;

Determining the time-frequency resources of the grant free uplink transmission by indicating the relative position with respect to the configured random access time-frequency resource. In some embodiments, the random access time-frequency resource may be directly configured by the system information RMSI (as indicated directly in the random access configuration table), or may be the final valid random access resource obtained by inference (such as the remained valid random access resources by eliminating some unavailable random access resources in consideration of the conflict with the downlink transmission, the conflict with the SSB, and unable to meet the complete mapping requirements, etc.).

Indicating the relative position with respect to the configured random access time-frequency resource includes indicating relative position information in the frequency domain of the grant free uplink transmission time-frequency resource with respect to the configured random access time-frequency resource, relative position information in the time domain, or relative position information in the code domain; that is, performing frequency-division, time-division or code-division on the grant free uplink transmission time-frequency resource and the configured random access time-frequency resource as follows:

① Frequency-division on the grant free uplink transmission time-frequency resource and the configured random access time-frequency resource A frequency domain interval between the grant free uplink transmission time-frequency resource and the random access resource is indicated in the configuration information, such as indicating that an interval between the frequency domain start position of the grant free uplink transmission resource and the lowest subcarrier in the lowest PRB of the random access resource is W frequency domain units; the number of GFOs in the frequency domain may also be indicated in the configuration information, such as Z GFOs consecutive in the frequency domain.

Figure 4:
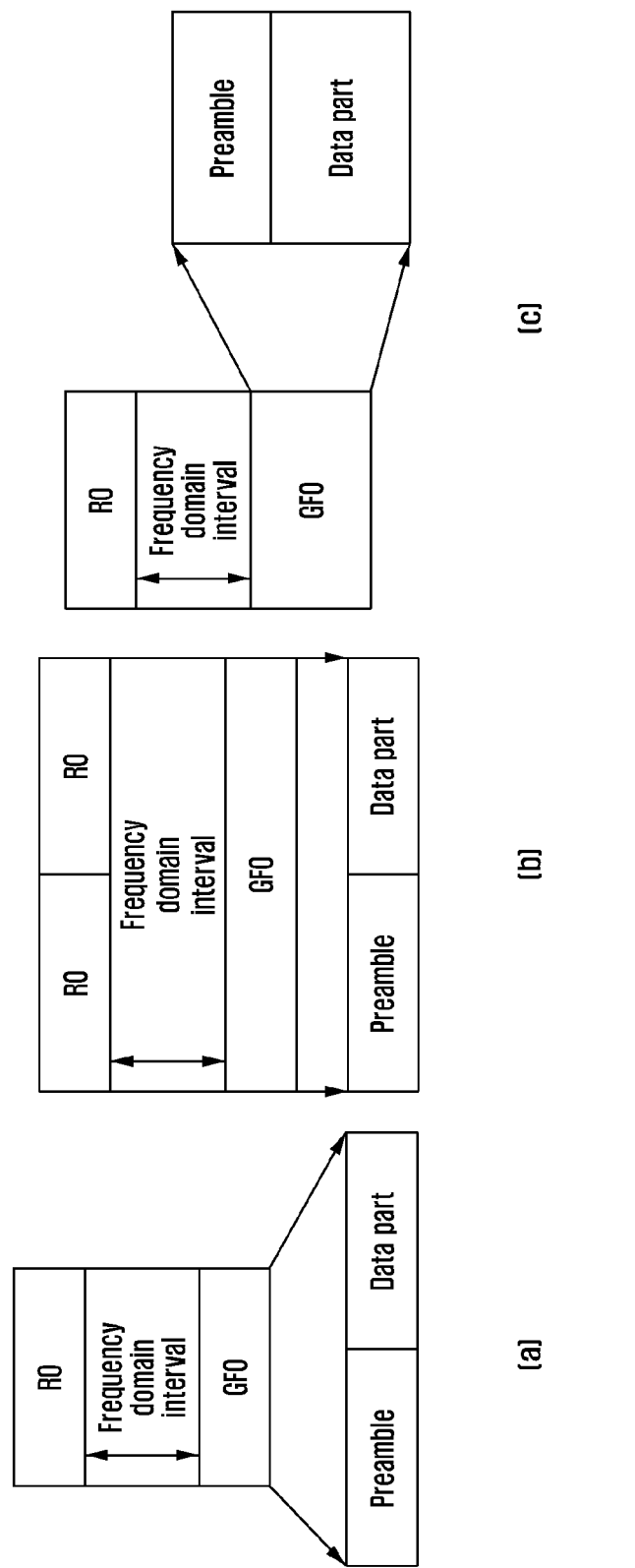
FIG. 4 is a schematic diagram showing frequency division of a random access opportunity and a grant free uplink transmission opportunity according to an embodiment of the present disclosure.

FIG. 4 shows the following three frequency division cases (a)-(c) for a random access opportunity (RACH occasion, RO) with a grant free uplink transmission opportunity.

(a) Frequency division of one RO with one GFO. The time-divided preamble and data part are respectively transmitted in one GFO; the data part may be composed of DMRS and data; in some embodiments, there may be only the data part, that is, all GFO resources are used to transmit the data part.

(b) Frequency division of multiple X (X>1) time-divided ROs with one GFO. The preamble and the data part are respectively transmitted in one GFO, and the preamble and the data part may be frequency-divided or time-divided. For example, according to the time division, the preamble is transmitted within the resource size of the first X1 ROs in the GFO, and the data part is transmitted within the resource size of X2=X-X1 ROs; taking 2 ROs as an example, X1=1, that is, the UE transmits the preamble within the resource with first RO size in the GFO, and transmits the data part within the resource with X2=1 ROs size in the GFO; the data part may be composed of DMRS and data; in some embodiments, there may be only the data part, i.e., all GFO resources are used to transmit the data part.

(c) Frequency division of one RO with one GFO. The frequency-divided preamble and data part are respectively transmitted in one GFO, and the data part may be composed of DMRS and data; in some embodiments, there may be only the data part, that is, all GFO resources are used to transmit the data part.

② Time-division on the grant free uplink transmission time-frequency resource and the configured random access time-frequency resource A time interval between the grant free uplink transmission time-frequency resource and the random access resource may be indicated in the configuration information, such as indicating that the time interval between the time start position of the grant free uplink transmission resource and the random access resource is: the interval of the last OFDM symbol in the last RO in one time slot is W time units; and/or time interval between the time slot where the RO is located and the time slot where the GFO is located, and the start OFDM symbol position of the GFO in the time slot; and the number of GFOs in the time domain may also be indicated in the configuration information, such as Z GFOs consecutive in the time domain.

Figure 5:
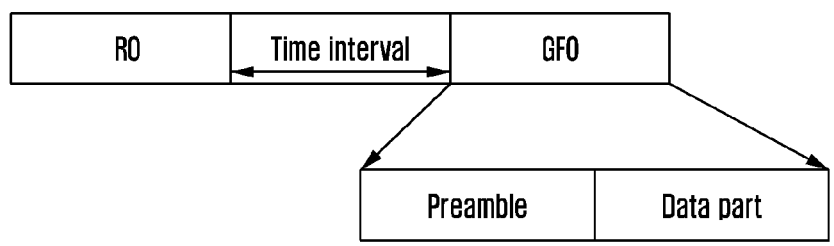
FIG. 5 is a schematic diagram showing time division of a random access opportunity and a grant free uplink transmission opportunity according to an embodiment of the present disclosure.
Figure 5:
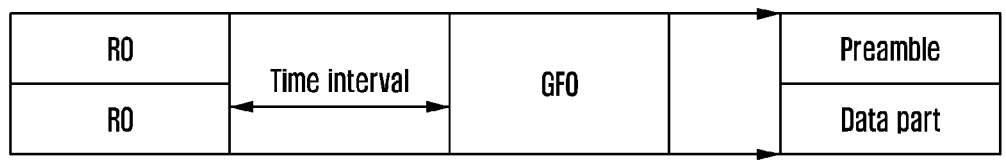
Figure 5:
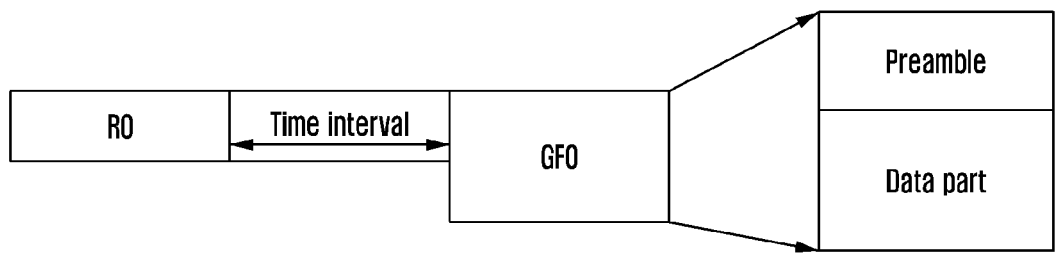

FIG. 5 shows the following three time division cases (a)-(c) for a random access opportunity and a grant free uplink transmission opportunity.

(a) Time division of one RO with one GFO. The time-divided preamble and data part are respectively transmitted in one GFO; the data part may be composed of DMRS and data; in some embodiments, there may be only the data part, that is, all GFO resources are used to transmit the data part.

(b) Time division of multiple X (X>1) frequency-divided ROs with one GFO. The preamble and the data part are respectively transmitted in one GFO, and the preamble and the data part may be frequency-divided or time-divided. For example, according to the frequency division, the preamble is transmitted within the resource size of the upper X1 ROs in the GFO, and the data part is transmitted within the resource size of the lower X2=X-X1 ROs; taking 2 ROs as an example, X1=1, that is, the UE transmits the preamble within the resource with one RO size of the upper portion in the GFO, and transmits the data part within the remaining resource with the X2=1 RO size in the GFO; the data part may be composed of DMRS and data; in some embodiments, there may be only the data part, i.e., all GFO resources are used to transmit the data part.

(c) Time division of one RO with one GFO. The frequency-divided preamble and data part are respectively transmitted in one GFO, and the data part may be composed of DMRS and data; in some embodiments, there may be only the data part, that is, all GFO resources are used to transmit the data part.

③ Code division on the grant free uplink transmission time-frequency resource and the configured random access time-frequency resource The configuration information may indicate that some or all of the random access resources may be used as the grant free uplink transmission time-frequency resource, for example, indicating that the corresponding RO index is an available grant free uplink transmission resource. However, the configuration information may also indicate a preamble index or an index range used in the grant free uplink transmission. For example, regarding the preambles used for random access, the 0th to the (M_ra−1)th preambles generated by the root sequence index being X and the cyclic shift being Y are used for random access, and the (M_ra)th to (M_ra+M_gf−1)th preambles generated by the root sequence index being X, and the cyclic shift being Y are used for the grant free uplink transmission.

(2) The mapping relationship between the grant free uplink transmission time-frequency resource and the downlink beam The downlink beam may be an index of a synchronization signal/PBCH block (SSB) or an index of a channel state information-reference signal (CSI-RS). Here, the SSB is mainly described as an example, and the mapping relationship includes at least one of the following ways:

Configuring a separate mapping relationship between the grant free uplink transmission time-frequency resource and downlink beam.

Figure 6:
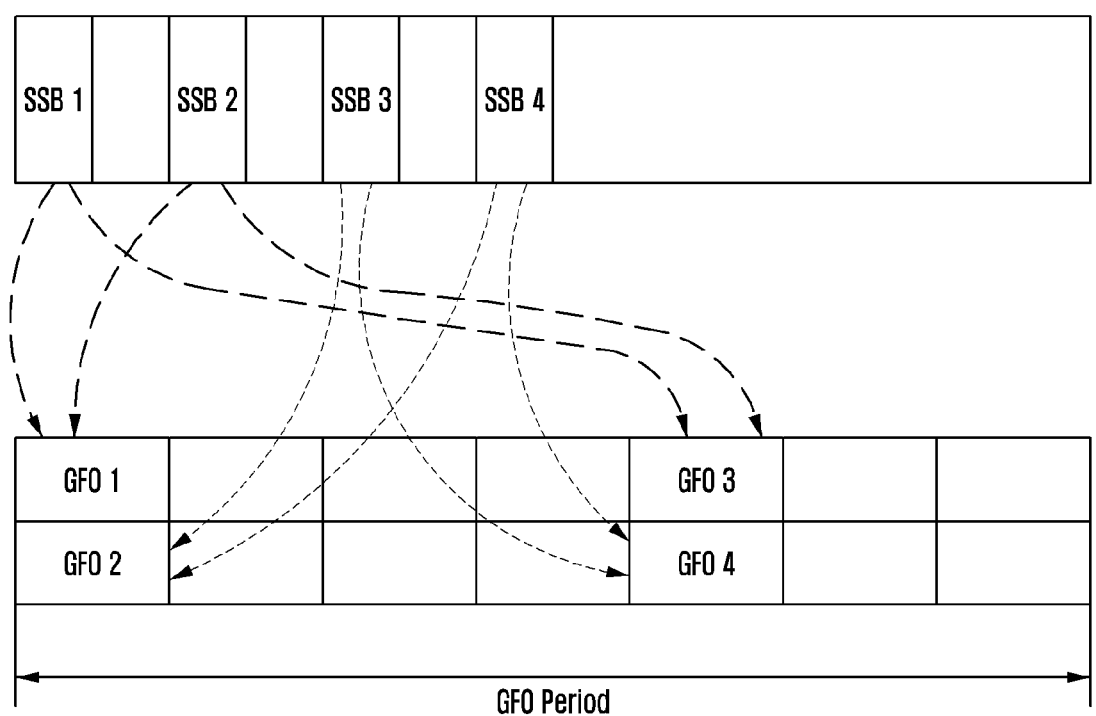
FIG. 6 is a diagram showing an example of mapping relationship between a grant free uplink transmission time-frequency resource and a downlink beam according to an embodiment of the present disclosure.
Figure 7:
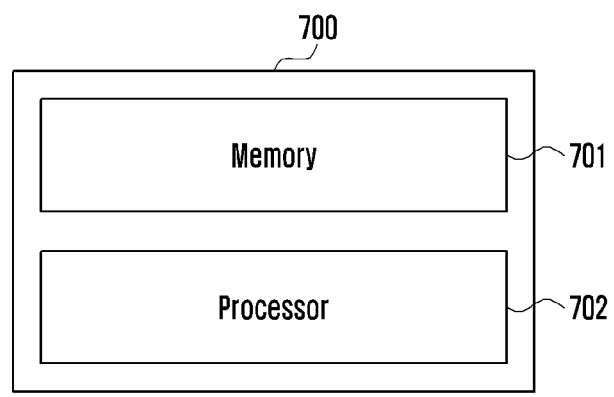
FIG. 7 is a block diagram of a user equipment according to an embodiment of the present disclosure.
Figure 8:
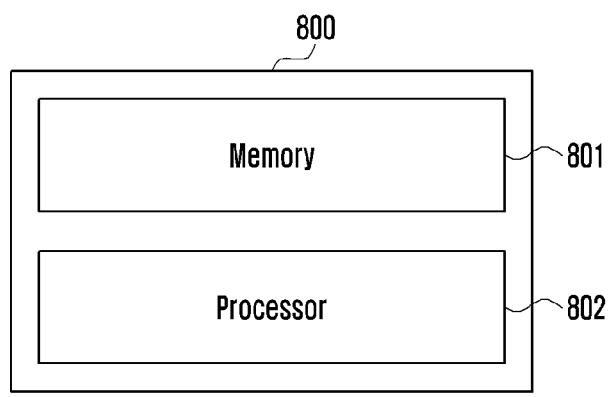
FIG. 8 is a block diagram of a base station device according to an embodiment of the present disclosure.

The number of SSBs per GFO is defined, i.e. numOfSSB-perGFO, and the number of SSBs that can be mapped onto one GFO may be inferred by the UE through the number of SSBs configured by the network base station. According to the principle of time domain priority or frequency domain priority, the UE may infer the available GFO by the mapping relationship after selecting the SSB. For example, the network is configured with 4 SSBs, and there are 4 GFOs in one period, where 2 GFOs are in frequency domain and 2 GFOs are in time domain, as shown in FIG. 6. FIG. 6 shows a schematic diagram showing time division of a random access opportunity and a grant free uplink transmission opportunity according to an embodiment of the present disclosure. The configured numOfSSBperGFO=2 means that two SSBs are mapped onto one GFO. Taking the frequency domain priority principle as an example, the UE may infer that the GFO indexes corresponding to SSB1 and SSB2 are GFO1 and GFO3, and the GFO indexes corresponding to SSB3 and SSB4 are GFO2 and GFO4.

Reusing the mapping relationship between the random access time-frequency resource and the downlink beam.

For example, when the grant free uplink transmission time-frequency resource has a certain relative relationship with the random access time-frequency resource (such as time division, frequency division, code division, etc.), the mapping relationship between the random access time-frequency resource and the downlink beam may be reused, to find the corresponding time-frequency resource for grant free uplink transmission;

A combination of the above two ways.

When the network base station does not configure a separate mapping relationship between the grant free uplink transmission time-frequency resource and the downlink beam, the UE uses the mapping relationship between the random access time-frequency resource and the downlink beam to obtain the grant free uplink transmission time-frequency resource corresponding to the determined SSB. When the network base station configures the separate mapping relationship between the grant free uplink transmission time-frequency resource and the downlink beam, the UE uses the configured mapping relationship between the grant free uplink transmission time-frequency resource and the downlink beam to obtain the grant free uplink transmission time-frequency resource corresponding to the determined SSB.

(3) Mapping relationship between the grant free uplink transmission preamble and/or de-modulation reference signal (DMRS) and/or multiple access signature (MAS) resource and the downlink beam In this embodiment, M_code is used to indicate the maximum number of preambles for grant free uplink transmission available on one GFO, and/or the maximum number of de-modulation reference signals (DMRS), and/or the maximum number of multiple access signatures (MAS). The maximum number may be the available maximum number configured by system, or the physically available maximum number.

In this embodiment, the multiple access signature may be a combination of one or more of: a bit-level spreading spectrum sequence, a bit-level interleaving sequence, a bit-level scrambling sequence, a bit-level to symbol-level codeword or codebook, a symbol-level spreading spectrum sequence, a symbol-level scrambling sequence, a symbol-level interleaving sequence, a symbol to resource element (RE) mapping codebook or pattern; power factor, phase factor, etc. In some embodiments, the spreading spectrum sequence may be a complex spreading spectrum sequence or a sparse spreading spectrum sequence, i.e., a spreading spectrum sequence containing zero values. In some embodiments, the bit-level to symbol-level codeword or codebook may be a sparse bit-level to symbol-level codeword or codebook, i.e., a bit-level to symbol-level codeword or codebook containing zero values. In some embodiments, the symbol to RE mapping codebook or pattern may be a sparse symbol to RE mapping codebook or pattern, i.e., some REs are not mapped with symbols.

In this embodiment, the mapping relationship includes at least one of the following ways:

Configuring a separate mapping relationship between the preamble and/or DMRS and/or multiple access signature resource for the grant free uplink transmission and the downlink beam.

The number of SSBs per GFO is defined, i.e. numOfSSB-perGFO, and the number of SSBs that can be mapped onto one GFO may be inferred by the UE through the number of SSBs configured by the network base station; according to the principle of time domain priority or frequency domain priority, the UE may infer the available GFO by the mapping relationship after selecting the SSB; then the M_code is divided into numOfSSBperGFO groups, and each group corresponds to one SSB; taking DMRS sequences as an example, if the DMRS sequences available on one GFO is at most M_code=12, and numOfSSBperGFO=2, the UE may know two SSBs mapped onto the GFO, and each SSB corresponds to six DMRS sequences respectively; if SSB1 and SSB2 are taken as examples, it can be seen that SSB1 corresponds to DMRS 0~5, and SSB2 corresponds to DMRS 6~11; in particular, the SSB may also determine the corresponding DMRS according to a certain interval rule, such as SSB1 corresponding to even DMRS indexes (DMRS 0, 2, 4, 6, 8, 10), and SSB2 corresponding to odd DMRS indexes (DMRS 1, 3, 5, 7, 9, 11); in particular, the SSB may also determine the corresponding DMRS according to a certain root sequence index (sequential root sequence), for example, SSB1 corresponds to the DMRS sequence generated by root sequence 1, and SSB2 corresponds to the DMRS sequence generated by root sequence 2;

Reusing the mapping relationship between the random access preamble and the downlink beam to obtain a preamble for the grant free uplink transmission, and obtaining DMRS and multiple access signature resource for grant free uplink transmission through the mapping relationship between the preamble for the grant free uplink transmission and the DMRS or multiple access signature resource.

For example, by using the mapping relationship between the random access preamble and the downlink beam, the available preamble resources for the grant free uplink transmission corresponding to the determined SSB are obtained, and a preamble is selected, so that an available DMRS sequence or sequence set may be obtained through the corresponding mapping relationship between the preamble and the DMRS (e.g., 1 to 1, N to 1, 1 to N, N to M, etc.), and then the UE may determine the used DMRS sequence, if 1 to 1, the UE may determine the available DMRS sequence after the preamble is determined, and if 1 to N, the UE may determine the available DMRS sequence set after the preamble is determined, and the UE randomly selects a DMRS sequence from the set in equal probability; the manner of determining the MAS is similar. In some embodiments, the preamble is mapped to DMRS and then remapped to MAS, or the preamble is mapped to MAS and then remapped to DMRS, or the preamble is mapped with DMRS and MAS, respectively.

Reusing the mapping relationship between the random access preamble and the downlink beam to obtain the available preamble resources for the grant free uplink transmission corresponding to the determined SSB, but for the mapping relationship between the DMRS and/or the multiple access signature resource and the downlink beam, the available DMRS and/or multiple access signature resources for the grant free uplink transmission corresponding to the determined SSB may be obtained according to the foregoing configured separate mapping relationship between the preamble and/or DMRS and/or multiple access signature resource for grant free uplink transmission and the downlink beam.

A combination of the above ways.

For example, if the network is configured with a separate mapping relationship between the preamble and/or DMRS and/or multiple access signature resource for grant free uplink transmission and the downlink beam, the available preamble and/or DMRS and/or multiple access signature resource for grant free uplink transmission corresponding to the determined SSB is obtained according to the mapping relationship. If the network is not configured with a separate mapping relationship between the preamble and/or DMRS and/or multiple access signature resource for grant free uplink transmission and the downlink beam, the UE obtains the available preamble and/or DMRS and/or multiple access signature resource for grant free uplink transmission corresponding to the determined SSB, according to the mapping relationship between the random access preamble and the downlink beam, with the methods of mapping relationship between the preamble and DMRS and/or MAS as described above.

(4) Resource pool for radio network temporary identifier (GF-RNTI) for grant free uplink transmission The resource pool includes a set of M available RNTI values, and the UE may select, in equal probability, one RNTI from the M RNTIs as the GF-RNTI for the grant free uplink transmission.

(5) Mapping relationship between GF-RNTI and at least one of the time-frequency resource for grant free uplink transmission, the grant free preamble, DMRS, and the multiple access signature resource Taking the time-frequency resource for the grant free uplink transmission as an example, the mapping relationship between the time-frequency resource for the grant free uplink transmission and the GF-RNTI is established. For example, if one GFO is mapped with one GF-RNTI value or one GF-RNTI set, the UE obtains the available GF-RNTI value or the set (the UE may randomly select one GF-RNTI from the set in equal probability), by the determined time-frequency resource for the grant free uplink transmission. Other methods using the mapping relationship between the grant free preamble/DMRS/multiple access signature resource and the GF-RNTI are similar.

(6) A control resource set for UE to monitor a grant free uplink transmission feedback and/or configurations of search spaces From the configuration information, the UE may obtain at least one of the following control resource information for monitoring the grant free uplink transmission feedback:

Frequency domain position (the frequency domain starting position, the number of frequency domain units). The frequency domain starting position may be an absolute starting position (e.g., notified by an absolute frequency value), and/or a relative starting position, such as based on a reference point, and then notifying a frequency domain offset to find the frequency domain starting position, wherein the reference point may be a reference point of the entire frequency domain carrier, and/or a reference point of a bandwidth part (BWP) in the carrier; the frequency domain offset may indicate how many frequency domain units are offset.

Time domain position (the time domain starting position, the number of time units). The time domain starting position may be an absolute starting position, such as notified by a specific system frame number (SFN) and/or a subframe index in a system frame, and/or a time slot index, and/or an OFDM symbol index, and/or a relative starting position, such as relative to a reference time position, and then notifying an offset on the time unit, the reference time position may be the last OFDM symbol of PDSCH/PDCCH/PBCH configured with the received system information, or the last OFDM symbol in the time slot; the offset on the time unit may be a one-level time unit offset, such as N time slots, or a multi-level time unit offset, such as N1 time slots and N2 OFDM symbols.

Monitoring period. The UE is notified of the time period within which the monitoring detection repeats. The monitoring period may be an absolute time such as 5 ms, 10 ms, 20 ms, 40 ms, etc.; or the number of time units, such as 1 time slot, 1 subframe, and the like.

Maximum number of detections. The UE is notified of the number of PDCCH candidates that need to be monitored corresponding to an aggregation level (AL) on a control resource for detecting the grant free uplink transmission feedback.

In some embodiments, the configuration information may also inform the UE of the number of control resources available to detect the grant free uplink transmission feedback in one monitoring period, such as the number of control resource sets, and/or the number of search spaces; and/or inform the UE of the number of control resources for detecting the grant free uplink transmission feedback that need to be monitored in one monitoring period, when the total number M_all of control resources available in one monitoring period is greater than the number M_need of control resources that the UE needs to monitor, that is, M_all>M_need, the UE also needs to determine the positions of the M_need control resources that need to be monitored, for example, the former M_need or latter M_need in the M_all, or the corresponding M_need indexes in the Mall explicitly indicated in the configuration information.

(7) Maximum number N_max of transmissions of the grant free uplink transmission (8) Maximum transmission time T_time of the grant free uplink transmission Referring back to FIG. 3, the user receives, from the downlink channel, a system broadcast message (including a primary broadcast message, RMSI and/or other system information OSI) of the base station or downlink control channel information or higher layer control signaling information; the user obtains configuration information for performing the grant free uplink transmission; the UE determines GF-RNTI for the grant free uplink transmission according to a certain rule, wherein the certain rule may include at least one of the following:

The UE obtains a RNTI resource pool (i.e., a RNTI resource set) for the user performing grant free uplink transmission from the configuration information, and selects one RNTI from the RNTI resource pool in equal probability as the GF-RNTI for performing the grant free uplink transmission by itself.

Determining the GF-RNTI for the grant free uplink transmission according to the mapping relationship between the GF-RNTI and at least one of the time-frequency resource, the preamble, the DMRS, and the multiple access signature resource for grant free uplink transmission in the configuration information.

Specifically, the UE obtains, from the configuration information, a mapping relationship between the GF-RNTI and the time-frequency resource/preamble/DMRS/multiple access signature resource for grant free uplink transmission; and determines a corresponding GF-RNTI by selecting the time-frequency resource/preamble/DMRS/multiple access signature resource for grant free uplink transmission. Taking the grant free uplink transmission time-frequency resource as an example, by using the mapping relationship between the grant free uplink transmission time-frequency resource and the GF-RNTI, for example, one GF-RNTI value or one GF-RNTI set is mapped onto one GFO, the UE obtains an available GF-RNTI value or set (the UE may randomly select one GF-RNTI from the set in equal probability) by the determined grant free uplink transmission time-frequency resource. Other methods using the mapping relationship between the grant free preamble/DMRS/multiple access signature resource and the GF-RNTI are similar.

The UE calculates the GF-RNTI for the grant free uplink transmission according to the determined grant free uplink transmission time-frequency resource, and/or the selected grant free uplink transmission time-frequency resource/preamble/DMRS/multiple access signature resource. Wherein, the calculation method is as follows:

Performing the calculation according to GFO index where the determined grant free uplink transmission time-frequency resource is positioned, and/or the time unit index (such as the slot index), and/or the OFDM symbol index, and/or the subframe index, and/or the carrier index (the carrier index may refer to different carriers, or supplemental uplink carriers or non-supplemental uplink carriers), etc.; possible calculation methods include:

GF-RNTI=1+$s\_id$+14×$t\_id$+14×80×$f\_id$+14×80×8×$ul\_carrier\_id$;

wherein s_id is the index of the first OFDM symbol in which the GFO determined by the UE is positioned, and t_id is the slot index in the system frame in which the GFO determined by the UE is positioned; f_id is the index of the GFO determined by the UE in the frequency domain; ul_carrier_id is the carrier index determined by the UE to transmit the grant free uplink transmission.

When determining the grant free uplink transmission time-frequency resource based on the configured random access time-frequency resource, the GF-RNTI is obtained by calculating the radio network temporary identifier RA-RNTI on a corresponding random access channel. For example, the random access channel is mapped with the grant free uplink transmission time-frequency resource, a corresponding random access channel is found by using the determined grant free uplink transmission time-frequency resource, and the RA-RNTI calculated on the corresponding random access channel is used.

In addition, the UE may also determine the grant free uplink transmission time-frequency resource and/or preamble and/or DMRS and/or multiple access signatures according to at least one of the following ways.

Mapping relationship between the time-frequency resource and/or the preamble and/or DMRS and/or MAS resource for grant free uplink transmission and the downlink beam; and Mapping relationship between GF-RNTI and the time-frequency resource/the preamble/DMRS/multi-access signature resource for grant free uplink transmission.

The GF-RNTI determined by the above several methods may also be used for the user to generate a scrambling sequence c when the grant free uplink transmission is to be performed.

For example, the user channel-encodes the prepared information bit sequence to a single-stream or multi-stream encoded bit sequence b(0), . . . , b(M−1), wherein M is the length of the encoded bit sequence, and in particular, when the user performs multi-stream transmission, M may be the total length before the shunt, or the length of the single stream after the shunt. The encoded bit sequence needs to be scrambled before modulation to obtain the scrambled encoded sequence s(0), . . . , s(M−1), with s(i)=[b(i)+c(i)] mod 2, and mod 2 represents modulo 2 operation; wherein the initialization value c_init of the scrambling sequence c(0), . . . , c(M−1) is obtained by one of the following formulas:

$c\_init = n\_rnti * 2^{15} + n\_id$ $c\_init = n\_rnti * 2^{14} + q * 2^{13} + \lfloor n_s/2 \rfloor * 2^{9} + n\_id$ Wherein, n_id may be a data scrambling identity configured by the higher layer signaling, or a network identifier (cell id, $N_{ID}^{cell}$) of the cell; ns is a time unit index, for example, representing a slot number in a system frame (slot index in a radio frame); q may be a codeword index, such as when there is only one single codeword for transmission, q=0; in the present disclosure, for the grant free uplink transmission, n_rnti may be GF-RNTI; and the method for determining GF-RNTI has been described in the above several methods, and will not be described again.

The scrambling sequence c(0), . . . , c(M−1) may be generated by a Gold sequence of length 31, such as $c(n) = [x1(n+Nc) + x2(n+Nc)] \mod 2$, and $x1(n+31) = [x1(n+3) + x1(n)] \mod 2$; and $x2(n+31) = [x2(n+3) + x2(n+2) + x2(n+1) + x2(n)] \mod 2$;

Wherein Nc is a fixed value, such as Nc=1600; x1 and x2 represent two M sequences of length 31, respectively; and x1(n) is initialized to x1(0)=1, x1(n)=0, n=1, 2, . . . , 30; and x2(n) is initialized to c_init generated above, such as $$c\_init = \sum_{i=0}^{30} x_2(i) * 2^i,$$

which means that c_init is converted to a binary number, and then the data corresponding to the i-th bit is the value of x2(i).

The above is an example of generating a scrambling sequence, not limited to the only way;

When the UE starts the initialization setting of the grant free uplink transmission, if the configuration information received by the UE includes the maximum number of transmissions N_max of the grant free uplink transmission and/or the maximum transmission time T_time of the grant free uplink transmission, and if this is the first transmission of the data by the UE, that is, the initial transmission, the UE sets a transmission counter GF_transmission_counter to 1, and/or starts a transmission timer GF_transmission_timer after the first transmission.

The UE performs the grant free uplink transmission. The uploaded data may include a user identifier (ID) for conflict resolution. The user ID may be one or more of the following:
- Temporary Mobile Subscriber Identity S-TMSI;
- C-RNTI (users who have already obtained a valid C-RNTI);
- a fixed random number, such as N-bit (N is a positive integer, such as 40) random number;

Referring to FIG. 3, the base station detects uplink signal transmission from the user on the time-frequency resource configured for grant free uplink transmission. Downlink feedback is performed on the successfully detected and decoded uplink signal, and GF-RNTI corresponding to the successfully detected and decoded signal is used in the downlink feedback. If the downlink control channel is used to feed back to the user, the GF-RNTI scrambling is used in the cyclic redundancy check (CRC) of the downlink control channel; the downlink feedback may include one or more of the following:
- Uplink transmission grant for new data;
- Uplink grant for data retransmission;
- An identity, such as an ACK, indicating that the previous uplink transmission was successful or that no data retransmission is required;
- A conflict resolution identifier which may be a user identifier used by the UE for conflict resolution included in the grant free uplink transmission;
- Temporary C-RNTI value; and
- Timing advance information.

With continued reference to FIG. 3, the UE detects possible feedback from the base station on the time-frequency resource obtained from the determined control resource set and/or the search space configuration for monitoring the grant free uplink transmission feedback through the previously determined GF-RNTI for the grant free uplink transmission. When the CRC of the detected PDCCH is descrambled by using the GF-RNTI, if the CRC after the descrambling is successful, the UE obtains the correct PDCCH. The feedback to the UE from the base station may be directly in the PDCCH or in PDSCH specified by the downlink scheduling in the PDCCH.

In the feedback detected by the UE:
- When a conflict resolution identifier matching the user identifier for conflict resolution included in the grant free uplink transmission of the UE is included, the UE considers the feedback to be the correct feedback matching itself;
- When the uplink transmission grant for new data is included, the UE transmits the new data according to the uplink transmission grant for the new data;
- When the uplink grant for data retransmission is included, the UE performs retransmission of data according to the retransmission uplink transmission grant for the previous data;
- When an identifier (such as ACK) is included to indicate that the previous uplink transmission has succeeded, or when data retransmission is not required, the UE considers that the previous transmission is completed without retransmission or new transmission;
- When a temporary C-RNTI value is included, if the UE does not have a C-RNTI before, the temporary C-RNTI value is set to its own C-RNTI value; if the UE has a C-RNTI value before, the previous C-RNTI is cleared, and the temporary C-RNTI value is set to its own C-RNTI value.
- When timing advance information is included, if the UE receives feedback from the base station at time N, the UE performs uplink transmission using the indicated timing advance information in a time unit after N+k; the uplink transmission includes subsequent grant free transmission or grant-based transmission;

In some embodiments, when the UE does not detect the correct feedback (e.g., the correct PDCCH is not detected) or the detected feedback does not match the user identifier for conflict resolution previously included in the grant free uplink transmission, the UE may perform the following operations:
- If the transmission timer GF_transmission_timer has not timed out, and/or the transmission counter GF_transmission_counter is incremented by 1 and the value of the transmission counter after incremented by 1 does not exceed the maximum number of transmissions N_max of the grant free uplink transmission, that is, GF_transmission_counter+1≤N_max, the UE re-performs the grant free uplink transmission; or
- If the transmission timer GF_transmission_timer times out, and/or the transmission counter GF_transmission_counter is incremented by 1 and the value of the transmission counter after incremented by 1 exceeds the maximum number of transmissions N_max of the grant free uplink transmission, i.e. GF_transmission_counter+1>N_max, the UE stops the grant free uplink transmission, and reports to the upper layer the grant free uplink transmission problem.

Figure 9:
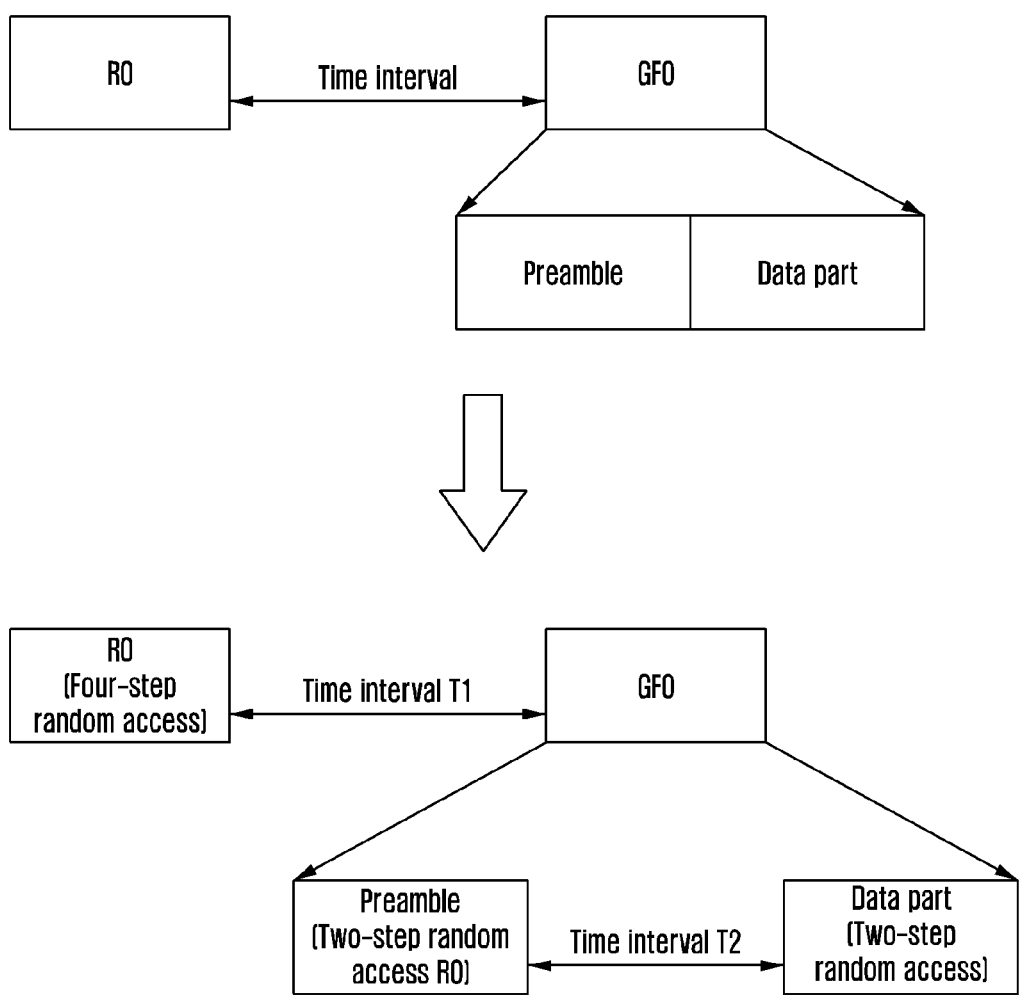
FIG. 9 is a schematic diagram of determining an uplink transmission resource situation according to an embodiment of the present disclosure.

In particular, in another embodiment of the present disclosure, a two-step random access transmission using the grant free uplink transmission method proposed by the present disclosure will be described. In the present embodiment, the grant free uplink transmission can be regarded as including two cases:

1. If the grant free uplink transmission includes random access preamble transmission and uplink data transmission, in particular, the time-frequency resource position of the random access preamble transmission in the grant free uplink transmission time-frequency resource is referred to as a two-step random access preamble time-frequency resource, and the time-frequency resource position of the uplink data transmission is referred to as a two-step random access uplink data time-frequency resource; at this time, if the system configures a random access time-frequency resource, the random access time-frequency resource may be represented as a four-step random access time-frequency resource; then the method described in the above embodiment may be used for a) Determining the grant free uplink transmission resources (including the random access resource for the preamble in the grant free uplink transmission and the resource for the data part in the grant free uplink transmission) by using a relative relationship between the configured four-step random access resource and the grant free uplink transmission; for example, in the grant free uplink transmission resources, the time-frequency resource where the preamble is located begins from the first time unit routinely, and the relationship between the resource for the data part and the preamble is pre-fixed or pre-configured, as shown in FIG. 9, taking the time unit as an example only, the time interval T1 and/or T2 may be pre-defined or pre-configured at the network side; the method using the relative relationship in combination with time and/or frequency domain is similar, or b) Determining the resources for the preamble in the grant free uplink transmission by using a relative relationship between the configured four-step random access resource (time-frequency resource and/or preamble resource) and the random access resource (time-frequency resource and/or preamble resource) for the preamble in the grant free uplink transmission; and determining the resources for the data part in the grant free uplink transmission by configuring a relative relationship between the resource for the preamble in the grant free uplink transmission and the resource (time-frequency resource and/or DMRS resource) for the data part in the grant free uplink transmission.

Figure 10:
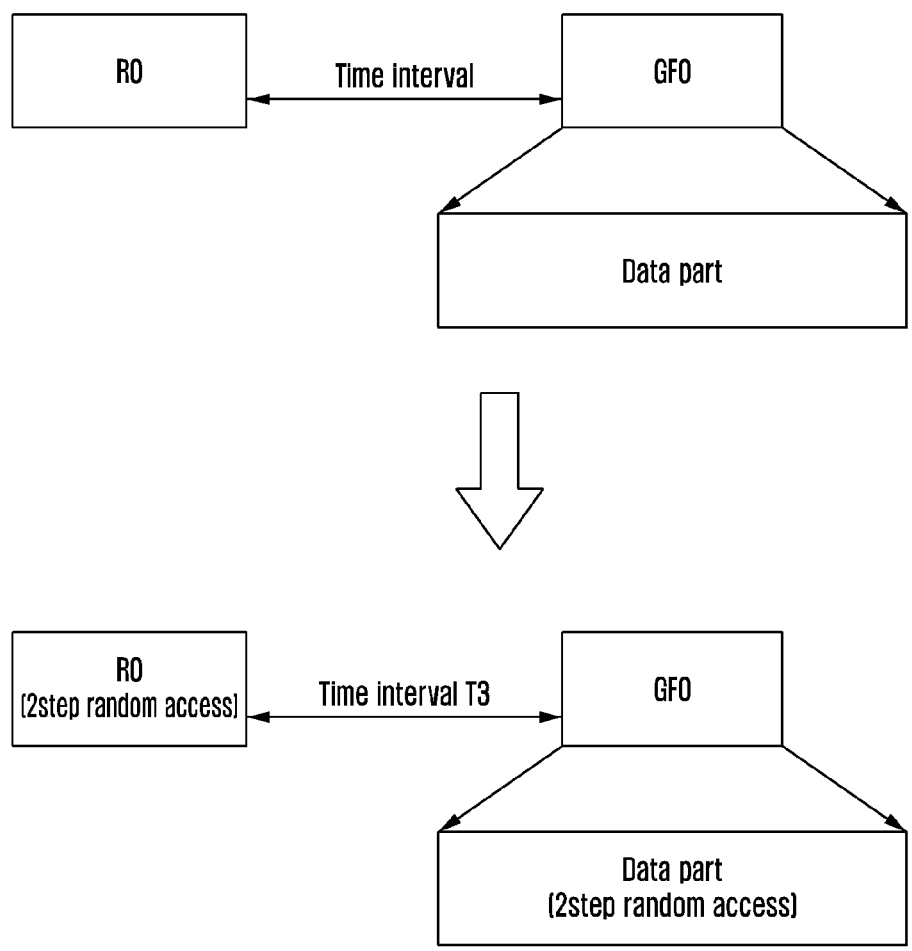
FIG. 10 is a schematic diagram of determining an uplink transmission resource situation according to another embodiment of the present disclosure.

2. If the grant free uplink transmission simply includes the uplink data transmission (that is, does not include the preamble transmission), the time-frequency resource location of the uplink data transmission is referred to as a two-step random access uplink data time-frequency resource; at this time, if the system configures a random access time-frequency resource, the random access time-frequency resource may be represented as a two-step random access time-frequency resource; then the method described in the above embodiment may be used to determine the grant free uplink transmission resources (that is, the resource for the data part in the grant free uplink transmission) by using the configured two-step random access resource, and a relative relationship between the pre-defined or pre-configured two-step random access resource and the grant free uplink transmission; as shown in FIG. 10, taking the time unit as an example only, the time interval T3 may be pre-defined or pre-configured at the network side.

In particular, the time interval (i.e., relative relationship in time domain) in the above description may also be replaced by combining the time domain relative positional relationship and/or the frequency domain relative relationship; the method is similar and will not be described again.

Figure 11:
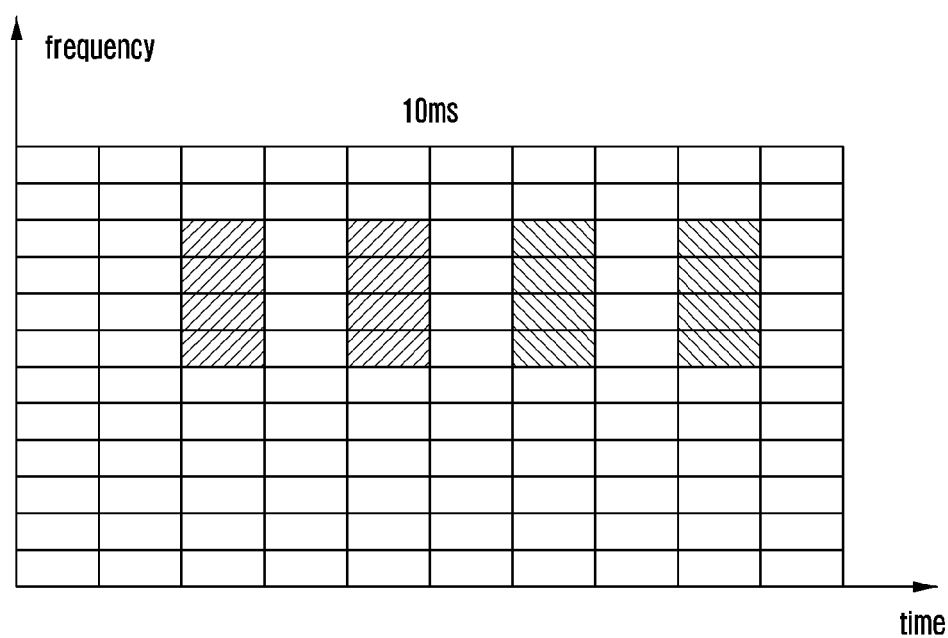
FIG. 11 is a schematic diagram showing partial time-domain sharing of a two-step random access time-frequency resource according to an embodiment of the present disclosure.
Figure 12:
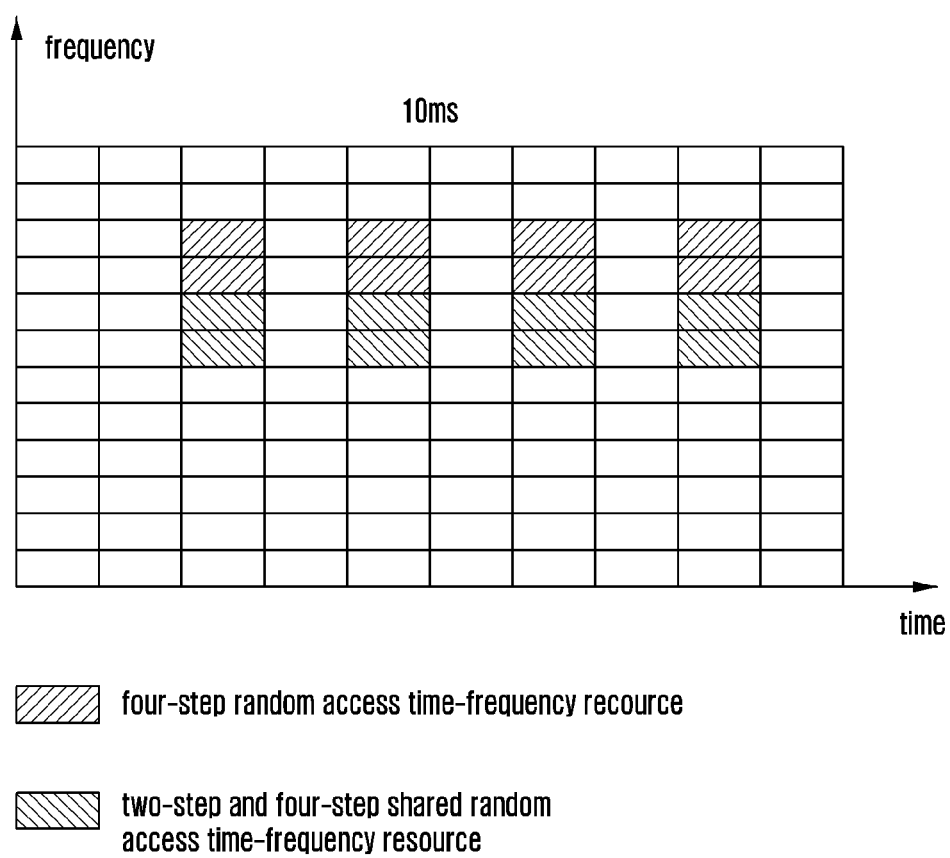
FIG. 12 is a schematic diagram showing partial frequency-domain sharing of a two-step random access time-frequency resource according to an embodiment of the present disclosure.
Figure 13:
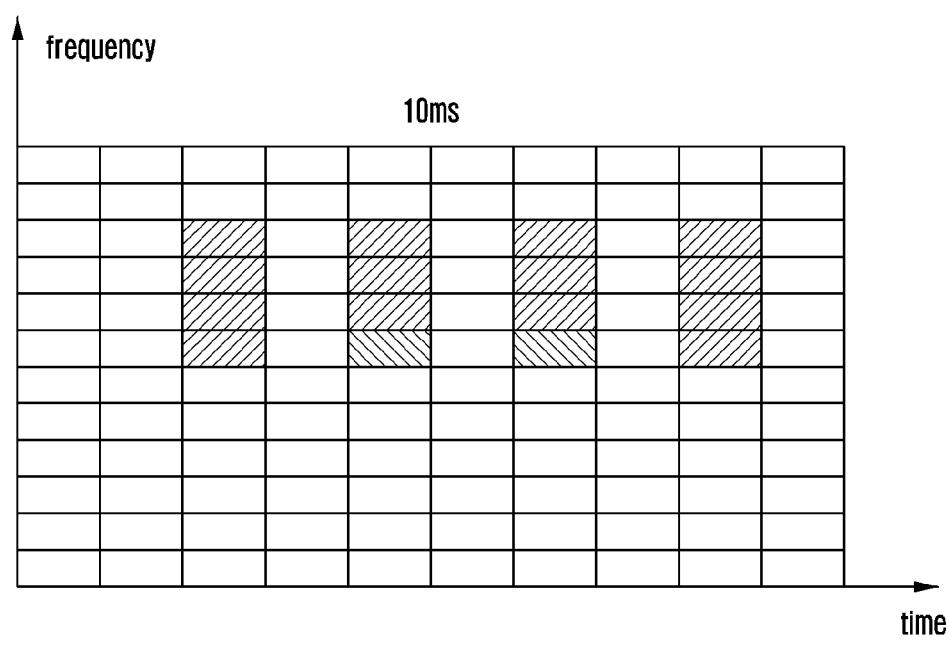
FIG. 13 is a schematic diagram showing partial time-frequency domain sharing of a two-step random access time-frequency resource according to an embodiment of the present disclosure.

In this embodiment, the base station transmits configuration information for transmitting and receiving (referred to as a 2 step RACH procedure in the present embodiment) of the uplink signal of the present disclosure to the user in system information, downlink control information, upper layer control information (such as RRC configuration message), and handover command message through the downlink channel (such as the downlink control channel PDCCH, the downlink shared channel PDSCH, and the downlink broadcast channel PBCH); the UE receives the configuration information, where the configuration information used for the two-step random access includes at least one of the following:

1. Random access resource configuration (including random access time-frequency resource and/or preamble resource)

a) If the two-step random access time-frequency resource is shared with the four-step random access time-frequency resource (for example, predefined at the network side (default) or informing the UE of the sharing of the two-step random access time-frequency resource and four-step random access time-frequency resource via the SI, DCI, RRC message), then i. For the configuration of the two-step random access time-frequency resource, the four-step random access time-frequency resource configuration is reused, that is, according to the starting position of the four-step random access time-frequency resource configured at the network side, and/or the number of the four-step random access time-frequency resources, and/or the four-step random access time-frequency resource period, and/or the mapping relationship between the four-step random access time-frequency resource and the downlink signal (SSB and/or CSI-RS), etc., the UE may find available two-step random access time-frequency resource;

In particular, the two-step random access time-frequency resource is a part of common four-step random access time-frequency resource; including at least one of the following partial sharing methods:

A. Partial time domain sharing; that is, the network configures the starting position and/or the number of the two-step random access time-frequency resource in the time domain on the four-step random access time-frequency resource; the UE obtains the two-step random access time-frequency resource by receiving the configuration information, the configuration information may indicate the index of the starting RO and/or the number of ROs by direct N bits; or for example, indicate that the ROs after starting from the X-th RO are the two-step random access time-frequency resource through a relative relationship; for example, the four-step random access time-frequency resource has 4 ROs in the time domain as shown in FIG. 11, which are represented as RO 0~3; if the time domain starting location of the two-step random access time-frequency resource is RO 2, and the number is 2, it indicates that the two-step random access time-frequency resource is the random access time-frequency resource in the last two RO positions in the time domain;

B. Partial frequency-domain sharing; that is, the network configures the starting position and/or the number of the two-step random access time-frequency resource in the frequency domain on the four-step random access time-frequency resource; the UE obtains the two-step random access time-frequency resource by receiving the configuration information, the configuration information may indicate the index of the starting RO and/or the number of ROs by direct N bits; or for example, indicate that the ROs after starting from the Y-th RO are the two-step random access time-frequency resource through a relative relationship; for example, the four-step random access time-frequency resource has 4 ROs in the frequency domain as shown in FIG. 12, which are represented as RO 0~3; if the time domain starting location of the two-step random access time-frequency resource is RO 2, and the number is 2; it indicates that the two-step random access time-frequency resource is the random access time-frequency resource in the last two RO positions in the frequency domain;

C. Partial time-frequency domain sharing; that is, the network configures the starting position and/or the number of the two-step random access time-frequency resource in the time domain and frequency domain on the four-step random access time-frequency resource; the UE obtains the two-step random access time-frequency resource by receiving the configuration information, the configuration information may indicate the index of the starting RO and/or the number of ROs by direct N bits; or for example, indicate that the ROs after starting from the X/Y-th RO are the two-step random access time-frequency resource through a relative relationship; for example, the four-step random access time-frequency resource has 4 ROs in the time domain and frequency domain respectively as shown in FIG. 11, which are represented as RO_T 0~3 and RO_F 0~3; if the time domain starting location of the two-step random access time-frequency resource is RO_T=1, and the number is 2 and RO_F=3 and the number is 1, it indicates that the two-step random access time-frequency resource is the random access time-frequency resource in the second and third positions in the time domain and in the last one RO position in the frequency domain;

ii. For the configuration of the two-step random access preamble resource, the UE needs to determine:

The starting point of the available two-step random access preamble index; the determination method may be at least one of the following:

A. The UE determines by using a default (preset) preamble index starting position, such as starting from a random access preamble index of 0 or the same as the determined four-step random access preamble index as default;

B. The UE determines by the preamble index starting position configured at the network side, such as by PreambleFor2stepRACHStart;

C. The UE calculates by using the four-step random access preamble index starting point. If the UE determines the four-step random access preamble index starting point is represented as PreambleFor4stepRACHStart (for example, for a selected SSB index, the starting position of the preamble mapped thereto is determined), and the number of available four-step random access preamble indices is X (for example, for a selected SSB index, the number of preambles mapped thereto is determined), then PreambleFor2stepRACHStart=PreambleFor4stepRACHStart+X; specifically, the network configuration information may directly indicate that N four-step random access preambles are the two-step random access preamble, and the N preambles may be predefined as those having N minimum (maximum) index values in the four-step random access preambles.

The number of available two-step random access preambles; the determination method may be at least one of the following:

A. The UE determines by using a default (preset) number of preambles, for example, the number of available preambles preset by the system is N, or as default, the same as the number of four-step random access preambles;

B. The UE determines by the number of preambles configured at the network side, such as by numberOfPreambleFor2stepRACH; in particular, the value may be a specific indication of the number of preambles of the set A, for example numberOfRA-PreamblesFor2stepRAGroupA INTEGER (1 . . . 64)

wherein, when the data size in the user's message A is less than (not greater than) a preset or configured threshold S1, and/or the downlink PL (and/or RSRP) measured by the user is less than (not greater than) a preset or configured threshold S2, the UE selects the preamble from the set A; when the data size in the user's message A is not less than (greater than) a preset or configured threshold S1, and/or the downlink PL (and/or RSRP) measured by the user is not less than (greater than) a preset or configured threshold S2, the UE selects the preamble from the set B; at this time, the number of preambles in the set B is the number of all available preambles minus the number of available preambles in the set A; and the starting position of the preambles in set B may be the starting position of set A plus the number of available preambles in set A; in particular, the network configuration information may directly indicate that N four-step random access preambles are the two-step random access preamble, the N preambles may be predefined as those having N minimum (maximum) preamble index values in the four-step random accesses (all or set A or set B);

C. The UE calculates by using the number of four-step random access preambles, if the starting point of the four-step random access preamble index determined by the UE is represented as numberOfRA-PreamblesFor4stepRACH (for example, for a selected SSB index, the number of the mapped preamble is determined), determination is made based on a preset or configured relative relationship, such as the multiple relationship BETA (i.e. numberOfRA-PreamblesFor2stepRACH=numberOfRAPreamblesFor4stepRACH*BETA), or the difference relationship D (i.e. numberOfRAPreamblesFor2stepRACH=numberOfRA-PreamblesFor4stepRACH+D); in particular, the method of determining the preamble can be applied to the determination of the number of preambles of the set A or B separately.

b) When the two-step random access time-frequency resource is not shared with the four-step random access time-frequency resource (for example, predefined (default) at the network side or informing the UE of the two-step random access time-frequency resource not shared with the four-step random access time-frequency resource via the SI, DCI, RRC message), that is, the UE separately notifies by the two-step random access time-frequency resource, then i. For the configuration of the two-step random access time-frequency resource, the method for determination by the UE includes:

Fully separate notification, for example, the UE acquires the configuration of the two-step random access time-frequency resource by reading information indicated by the 2step RACH-ConfigCommon, wherein the indicated information includes at least one of the following:

A. The number of SSBs on each RO and/or the number of preambles corresponding to each SSB, ssb-perRACH-OccasionAndCB-PreamblesPerSSB;

B. The random access configuration index, prach-ConfigurationIndex, the indicated configuration of the two-step random access time-frequency resource in the time dimension, including: a two-step random access configuration period (that is, the configured two-step random access time-frequency resource periodically repeating on a time unit at one point); the length of time occupied in each cycle (for example, 10 ms) and the position X_2step of the time length (for example, the period is 40 ms, the time length 10 ms of the random access time-frequency resource is the (X_2step)th 10 ms in 40 ms, for example X_2step=2, X_2step mod(4)=2, representing the second 10 ms); the number and positions of ROs configured in the occupied time length;

C. The number of ROs in the frequency domain on the same time unit;

D. The starting position of the RO in the frequency domain.

Figure 14:
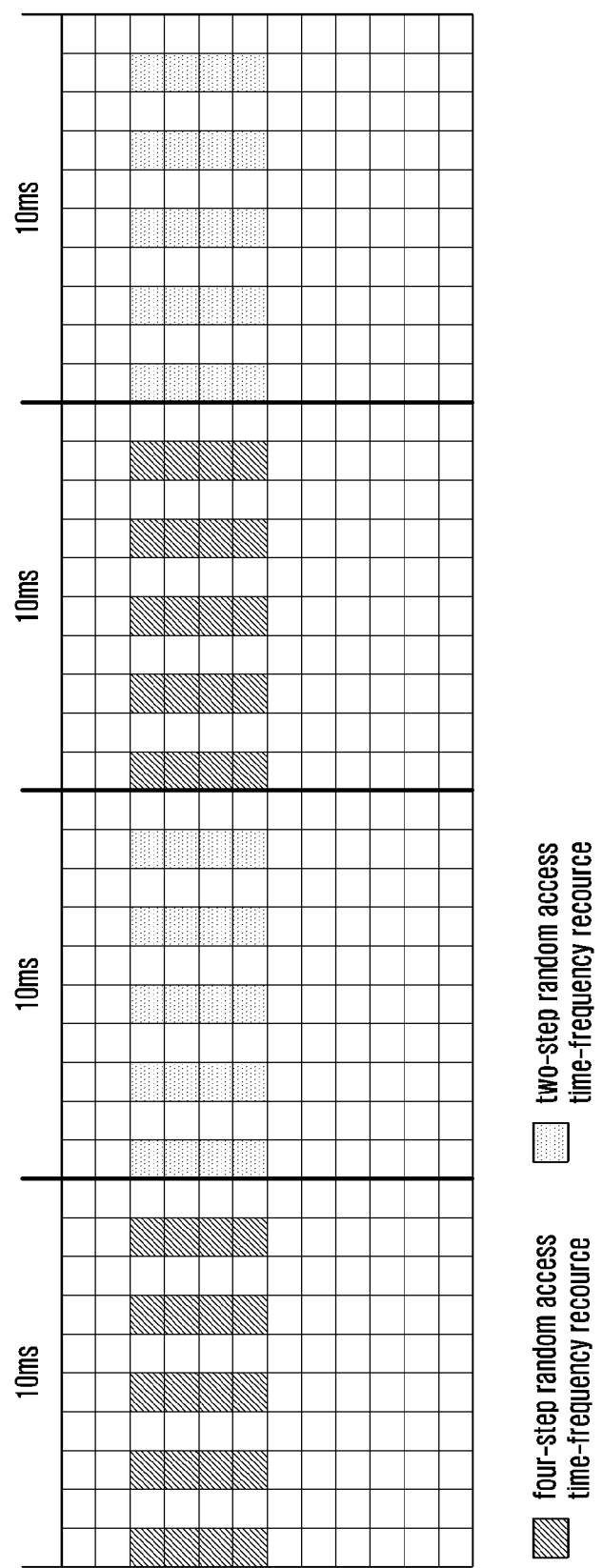
FIG. 14 is a schematic diagram of a method for confirming a two-step random access time-frequency resource according to an embodiment of the present disclosure.
Figure 15:
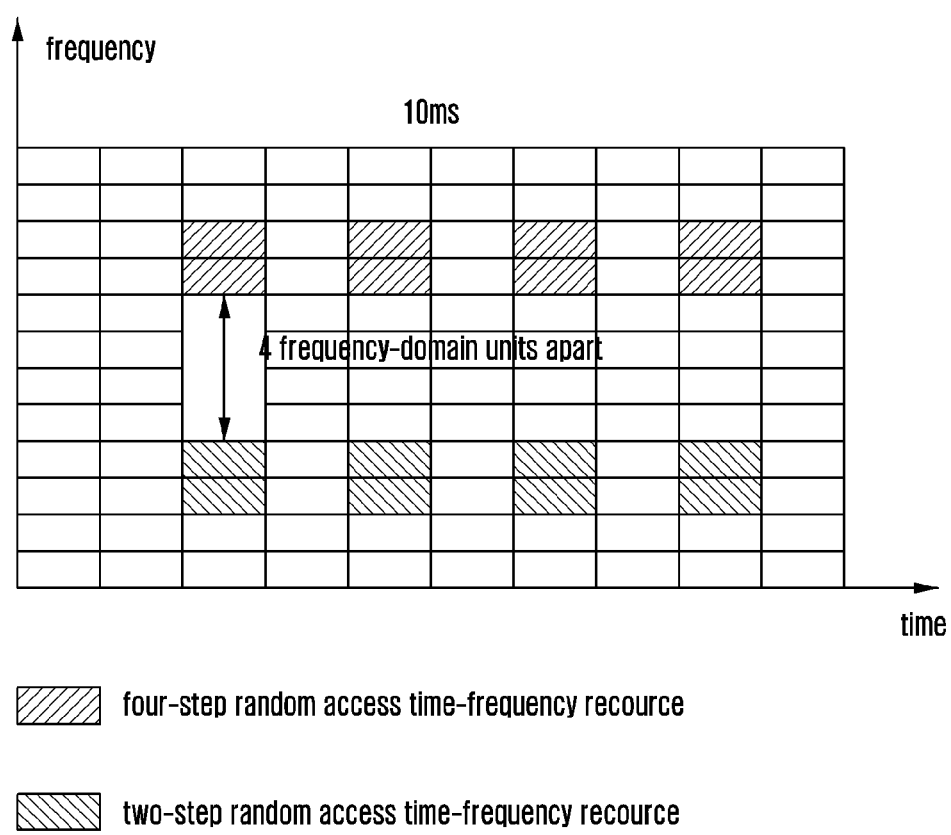
FIG. 15 is a schematic diagram of a method for confirming a two-step random access time-frequency resource according to an embodiment of the present disclosure.

Notifying relative relationship configuration information of the four-step random access time-frequency resource (in time domain and/or frequency domain), that is, the UE acquires configuration information of the two-step random access time-frequency resource by the configured four-step random access time-frequency resource information and relative relationship configuration information with respect to the four-step random access time-frequency resource (in time and/or frequency domain); wherein, the relative relationship configuration information with respect to the four-step random access time-frequency resource (in time and/or frequency domain) includes at least one of the following:

A. Time domain relative position information indication, including at least one of the following:

I) A relative relationship beta of the two-step random access configuration period 2stepRACH_period relative to the four-step random access configuration period 4stepRACH_period, indicating that 2stepRACH_period=beta*4stepRACH_period, for example, 4stepRACH_period=20 ms, beta=2, 2stepRACH_period is 40 ms; in particular, the relative relationship beta may also be preset by the system;

II) The offset (X_delta time units) of the position X_2step of the time length (for example, 10 ms) occupied by the two-step random access time-frequency resource relative to the position X_4step of the time length (for example, 10 ms) occupied by the four-step random access time-frequency resource in each random access configuration period, then X_2step=X_4step+X_delta, for example, the random access configuration period is 40 ms, X_delta=1, X_4step=1, indicating the time length occupied by the four-step random access time-frequency resource is the first 10 ms in 40 ms, and the time length occupied by the two-step random access time-frequency resource is the next 10 ms relative to the time length occupied by the four-step random access time-frequency resource, that is, the second 10 ms in 40 ms;

as shown in FIG. 14, the random access configuration period is 20 ms, and the time length occupied by the four-step random access time-frequency resource is the first 10 ms in one random access configuration period, and X_delta=1, then the time length occupied by the two-step random access time-frequency resource is the second 10 ms after the first 10 ms in one random access configuration period, and the number and positions of ROs in the time length occupied by the two-step random access time-frequency resource is the same as the number and positions of ROs in the time length occupied by the four-step random access time-frequency resource;

III) The number, and/or position, and/or period of the two-step random access time-frequency resource in time domain Pre-defined or network configured being the same as the number and positions of the four-step random access time-frequency resource in time domain;

B. Relative position information indication in frequency domain, including at least one of the following (if it indicates that the starting position of the first RO in the frequency domain on the same time unit of the four-step random access resource is FDMed_RO_start_4step and/or the number of ROs in the frequency domain on the same time unit is N_FDMed_RO_4step):

I) Interval size (that is, N frequency domain units) between the starting position (for example, the first subcarrier on the RO) of the first RO in the frequency domain of the two-step random access time-frequency resource and the ending position (for example, the last subcarrier on the RO) of the last RO in the frequency domain of the four-step random access time-frequency resource; as shown in FIG. 15, when the UE receives the indication that the interval size is 4 frequency domain units, the first frequency domain unit after the four frequency domain units starting from the ending position of the last RO of the four-step random access time-frequency resource is determined as the starting position of the first RO of the two-step random access time-frequency resource in the frequency domain;

II) The number of ROs of the two-step random access time-frequency resource in the frequency domain, which can be directly indicated by N bits, or predefined as the indication that the number of ROs of the four-step random access time-frequency resource in the frequency domain is reused (i.e., the same as the number of ROs of the four-step random access time-frequency resource in the frequency domain), or configured as a relative relationship (for example, the proportional size) with the number of ROs of the four-step random access time-frequency resource in the frequency domain.

C. Mapping relationship with the downlink beam; the mapping rule and corresponding parameter setting of the four-step random access time-frequency resource and the downlink beam may be reused;

ii. For the configuration of the two-step random access preamble resource, c) The format of the two-step random access preamble may be determined by at least one of the following:

i. Separate network side configuration, for example by preambleFormat_2step to indicate the format for the two-step random access preamble, for example by 2 bits to inform 4 possible preamble format configurations (including cyclic prefix length, and/or sequence length, and/or subcarrier spacing, and/or set of restrictions), in particular, the possible preamble configuration may be in the form of a preset table;

In particular, the UE does not desire to receive a two-step random access preamble configuration different from the time-frequency resource size (i.e., the size of one corresponding RO) occupied by the four-step random access preamble; for example, if the RO corresponding to the four-step random access preamble occupies 2 OFDM symbols (such as A1 configured as a short sequence), the two-step random access preamble that the UE desires to receive also occupies 2 OFDM symbols (such as A1 and/or B1);

ii. Determined by the configured four-step random access preamble format; that is, the network configures a four-step random access preamble format, and the UE sets the format for the two-step random access preamble according to the four-step random access preamble format;

d) Other random access resource configuration information, including at least one of the following:

i. The target receiving power of the two-step random access;

ii. The maximum number of retransmissions of the two-step random access;

iii. Four-step random access fallback indication; if it is enabled, the UE falls back to the four-step random access when certain conditions are met;

iv. Indication of the two-step random access resource usage; if it is enabled, the UE preferentially performs the two-step random access when the UE simultaneously configures four-step and two-step random access resources;

2. Data part (PUSCH and/or DMRS) resource configuration, including at least one of the following:

a) Time domain position configuration of PUSCH time-frequency resource:

i. Time-domain interval (that is, N time units) between the PUSCH time-frequency resource configured by the network device and the corresponding two-step random access time-frequency resource; and/or the time length occupied by the PUSCH time-frequency resource configured by the network device, that is, M1 time units or M1 two-step random access PUSCH resource units (the definition of the resource unit is similar to the definition of the GFO in the foregoing embodiments, i.e., the time-frequency resource size for transmitting a data part of a specific size is composed of predefined X time units, and Y frequency domain units); then the UE determines the first time unit after N (or N+x_id*M1; or N+x_id*M1*X; or N+x_id*M1+delta; or N+x_id*M1*X+delta) time units after the last time unit in the time range of the selected two-step random access time-frequency resource as the time domain starting position of the two-step PUSCH time-frequency resource corresponding to the selected two-step random access time-frequency resource. Wherein x_id may be the index t_id in the time domain of the selected RO, or an RO index, and delta is a predefined or configured additional time unit interval, its purpose could be to avoid inter-symbol interference as much as possible. The time range of the selected two-step random access time-frequency resource may be at least one of the following:

the selected two-step random access time-frequency resource (i.e. selected RO);

The random access configuration period where the selected two-step random access time-frequency resource is located or the last RO in the time domain;

A mapping circle from the downlink beam where the selected two-step random access time-frequency resource is located to the random access resource, or the last RO in the time domain An association period from the downlink beam where the selected two-step random access time-frequency resource is located to the random access resource, or the last RO in the time domain An association pattern period from the downlink beam where the selected two-step random access time-frequency resource is located to the random access resource, or the last RO in the time domain b) Frequency domain position configuration of PUSCH time-frequency resource:

i. Predefining or configuring the starting position of the frequency domain, for example, the frequency domain starting position of the two-step random access PUSCH and/or M2 frequency domain units (or resource units of the two-step random access PUSCH) are after the N frequency domain units from one frequency domain position; wherein the one frequency domain position may be:

Bandwidth part (bwp); carrier, etc.

Frequency domain starting position of the selected two-step random access RO;

Then, the UE determines that the frequency domain starting position of the two-step random access PUSCH corresponding to the selected RO may be the first frequency domain unit after N (or N+x_id*M2; or N+x_id*M2*Y; or N+x_id*M2+delta; N+x_id*M2*Y+delta) frequency domain units; wherein x_id is the frequency domain index of the selected RO, or the RO index; or the selected preamble index (the preamble indices on the entire RO or the available preamble indices corresponding to the two-step random access, for example, the preamble indices on the entire RO is 0 to 63, and the available preamble indices for the two-step random access is 54 to 63, and x_id may be 0~9); a special N may be used as 0; wherein delta may be expressed as a guard carrier, its purpose could be to avoid inter-carrier interference as much as possible;

c) Specifically, the two-step random access time-frequency resource and its corresponding two-step random access PUSCH resource have the same starting position and the ending position of the frequency domain;

d) If there is only one available DMRS resource on one two-step random access PUSCH, the PUSCH is mapped and selected in the preamble index increasing order; by the frequency domain priority or the time domain priority; wherein M1*M2 needs to ensure to provide enough two-step random access PUSCH resources for the possible preambles on the corresponding two-step random access time-frequency resource;

e) If there is more than one (e.g., W, e.g., W=12) available DMRS resources on one two-step random access PUSCH, then according to the increasing order of the selected preamble indices, the DMRS resources are sequentially mapped to the increasing order of the DMRS resource indices and to the increasing order of the available two-step random access PUSCH resources (or sequentially mapped to the increasing order of the available two-step random access PUSCH resource, and the increasing order of DMRS resource indices); if one RO has 24 preambles for two-step random access, there are two PUSCHs, and there are 12 DMRSs available for each PUSCH, then the user who selects the preambles of 0~11 determines the first PUSCH, and selects the DMRSs according to the DMRSs of 0~11 in the first PUSCH; if the user who selects the preambles of 12~23 determines the second PUSCH to be needed, and selects the DMRSs according to the DMRSs of 0~11 on the second PUSCH; wherein the PUSCH resource increasing order available may be time domain priority or frequency domain priority; wherein the DMRS resource indices may be expressed as different (DMRS resource positions, RE mapping patterns, sequence indices, cyclic shift values, frequency domain OCCs, time domain OCCs, or comb patterns, etc.).

f) The subcarrier spacing or waveform configuration of the two-step random access PUSCH is determined according to the subcarrier spacing or waveform configuration in the uplink BWP configuration;

3. The control resource set and/or search space for monitoring feedback may be configured separately or pre-defined to be the same as the control resource set and/or search space configuration for monitoring feedback (or RMSI) of the four-step random access.

After the UE acquires the configuration information of the two-step random access resource, the UE may perform operations including at least one of the following:

1. When the two-step random access time-frequency resource is shared with the four-step random access time-frequency resource, finding the available two-step random access time-frequency resource (i.e., RO) according to the selected downlink beam and mapping relationship, and then selecting one preamble from the available two-step random access preamble set, and determining the corresponding two-step random access PUSCH (including possible DMRS) by using the two-step random access PUSCH configuration information;

2. When the two-step random access time-frequency resource is not shared with the four-step random access time-frequency resource, If the two-step random access time-frequency resource is configured separately, finding the available two-step random access time-frequency resource (i.e., RO) according to the selected downlink beam and mapping relationship, and then selecting one preamble from the available two-step random access preamble set, and determining the corresponding two-step random access PUSCH (including possible DMRS) by using the two-step random access PUSCH configuration information;

If the two-step random access time-frequency resource is configured with respect to the four-step random access time-frequency resource, finding the available four-step random access time-frequency resource (i.e., RO) according to the selected downlink beam and mapping relationship, and then, through the configuration information, selecting the available two-step random access time-frequency resource (i.e., RO); then selecting one preamble in the two-step random access preamble set, and then determining the corresponding two-step random access PUSCH (including possible DMRS) by using the two-step random access PUSCH configuration information.

After the resource is determined, the UE is ready for the preamble and the message content included in the PUSCH to be sent, the coding method, etc.; after determining the transmission power after the power control, the message A (preamble and/or PUSCH) is sent out;

The UE monitors possible feedback information on the determined control resource set and/or search space for monitoring feedback, and performs subsequent operations;

If the UE does not detect the correct feedback (or no feedback), the UE increases a preamble transmission counter by one to perform the next transmission; or when the preamble transmission counter exceeds the maximum value, the UE reports the random access problem, or falls back to the four-step random access transmission.

The embodiment further provides a user equipment 700 for grant free uplink transmission. The user equipment includes a memory 701 and a processor 702, the memory having stored thereon computer executable instructions that, when executed by the processor, perform at least one of the methods corresponding to the various embodiments of the present disclosure.

Specifically, for example, the processor may be configured to determine, according to configuration information for the grant free uplink transmission received from a base station, a radio network temporary identifier GF-RNTI for the grant free uplink transmission and other configurations to transmit an uplink signal; and monitor feedback from the base station in a downlink control channel by using the determined GF-RNTI, and perform further operations according to the content of the feedback.

The embodiment further provides a base station device 800 for grant free uplink transmission. The base station device includes a memory 801 and a processor 802. The memory stores computer executable instructions that, when executed by the processor, perform at least one of the methods corresponding to the various embodiments of the present disclosure.

Specifically, for example, the processor may be configured to transmit, to a user equipment side, configuration information for determining a radio network temporary identifier GF-RNTI for grant free uplink transmission; and detect user's signal transmission on the configured grant free uplink transmission time-frequency resource, and perform downlink feedback on the successfully detected and decoded signal transmission, wherein the downlink feedback uses the GF-RNTI corresponding to the successfully detected and decoded signal transmission.

The configuration information may include at least one of: a grant free uplink transmission time-frequency resource set; a mapping relationship between a grant free uplink transmission time-frequency resource and a downlink beam; a mapping relationship between at least one of a grant free preamble, a DMRS or a multiple access signature resource and a downlink beam; a resource pool of GF-RNTI; a mapping relationship between GF-RNTI and at least one of a time-frequency resource, a preamble, a DMRS, or a multiple access signature resource for grant free uplink transmission; a control resource set for UE to monitor a grant free uplink transmission feedback and/or a configuration of search space; the maximum number of transmissions of the grant free uplink transmission; and the maximum transmission time of the grant free uplink transmission.

The configuration information may also be used to determine at least one of a grant free uplink transmission time-frequency resource, a grant free preamble, a de-modulation reference signal DMRS, and a multiple access signature MAS.

The present disclosure also provides a computer readable medium having stored thereon computer executable instructions that, when executed, perform any of the methods described in the embodiments of the present disclosure.

Specifically, for example, the processor may be configured to transmit, to a user equipment side, configuration information (the configuration information is the same as described above, and details are not described herein); and detect user's signal transmission on the configured grant free uplink transmission time-frequency resource, and perform downlink feedback on the successfully detected and decoded signal transmission, wherein the downlink feedback uses the GF-RNTI corresponding to the successfully detected and decoded signal transmission.

"User Equipment" or "UE" herein may refer to any terminal having wireless communication capabilities, including but not limited to mobile phones, cellular telephones, smart phones or personal digital assistants (PDAs), portable computers, image capture devices such as digital cameras, gaming devices, music storage and playback devices, and any portable unit or terminal with wireless communication capabilities, or Internet facilities that allow wireless Internet access and browsing, etc.

The term "base station" (BS) as used herein may refer to an eNB, an eNodeB, a NodeB, or a base station transceiver (BTS) or gNB, etc., depending on the technology and terminology used.

The "memory" herein may be of any type suitable for the technical environment herein, and may be implemented using any suitable data storage technology, including but not limited to semiconductor-based memory devices, magnetic memory devices and systems, optical memory devices and systems, fixed memories and removable memories.

The processor herein may be of any type suitable for the technical environment herein, including but not limited to one or more of a general purpose computer, a special purpose computer, a microprocessor, a digital signal processor DSP, and a multi-core processor architecture based processor.

The above description is only the preferred embodiments of the present disclosure, and is not intended to limit the present disclosure. Any modifications, equivalent substitutions, improvements, etc., which fall within the spirit and principle of the present disclosure, should be included in the scope of protection of the present disclosure.

Those skilled in the art will appreciate that the present disclosure includes apparatuses that are directed to performing one or more of the operations described herein. These apparatuses may be specially designed and manufactured for the required purposes, or may also include known devices in a general purpose computer. These apparatuses have computer programs stored therein that are selectively activated or reconfigured. Such computer programs may be stored in a device (e.g., computer) readable medium or in any type of medium suitable for storing electronic instructions and respectively coupled to a bus, including but not limited to any type of disks (including floppy disks, hard disks, optical disks, CD-ROMs, and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic card or light card. That is, the readable medium includes any medium that stores or transmits information in a form capable of being readable by a device (e.g., a computer).

Those skilled in the art will appreciate that each block of the structure diagrams and/or block diagrams and/or flow diagrams and combinations of blocks in the structure diagrams and/or block diagrams and/or flow diagrams can be implemented by computer program instructions. Those skilled in the art will appreciate that these computer program instructions can be implemented by a general purpose computer, a professional computer, or a processor of other programmable data processing methods, such that the scheme specified in one or more blocks of the structure diagrams and/or block diagrams and/or flow diagrams disclosed in the present disclosure is executed by a computer or a processor of other programmable data processing methods.

Those skilled in the art can understand that steps, measures, and schemes in various operations, methods, procedures discussed in the present disclosure may be alternated, modified, combined, or deleted. Further, other steps, measures, and schemes in various operations, methods, procedures discussed in the present disclosure may also be alternated, modified, rearranged, decomposed, combined, or deleted. Further, the operations, methods, and procedures in the related art having the same steps, measures, and schemes as in the various operations, methods, and procedures disclosed in the present disclosure may be alternated, changed, rearranged, decomposed, combined, or deleted.

The above is only a part of the embodiments of the present disclosure, and it should be noted that those skilled in the art can also make several improvements and modifications without departing from the principles of the present disclosure. The improvements and modifications should be considered as the scope of protection of the present disclosure.

The invention claimed is:

1. A method performed by a terminal for a 2-step random access procedure in a wireless communication, the method comprising:
    receiving, from a base station, a message including information on whether physical random access channel (PRACH) occasions for a 4-step random access type is shared with a 2-step random access type;
    identifying whether the PRACH occasions for the 4-step random access type is shared with the 2-step random access type based on the message;
    in case that the PRACH occasions for the 4-step random access type is shared with the 2-step random access type, transmitting, to the base station, a message A including a preamble based on a first configuration of PRACH occasions, wherein the first configuration of PRACH occasions is common for the 4-step random access type and the 2-step random access type; and
    in case that the PRACH occasions for the 4-step random access type is not shared with the 2-step random access type, transmitting, to the base station, a message A including a preamble based on a second configuration of PRACH occasions, wherein the second configuration of PRACH occasions is separately configured for the 2-step random access type.

2. The method of claim 1, wherein, in case that the PRACH occasions for the 4-step random access type is shared with the 2-step random access type, a preamble index of the preamble associated with a synchronization signal block (SSB) starts from an index which is determined based on a starting preamble index of preambles allocated for the 4-step random access type associated with the SSB and a total number of preambles for the 4-step random access type.

3. The method of claim 1, wherein the message further includes information indicating a subset of the PRACH occasions for the 4-step random access type shared with the 2-step random access type.

4. A method performed by a base station for a 2-step random access procedure in a wireless communication, the method comprising:
    identifying whether physical random access channel (PRACH) occasions for a 4-step random access type is shared with a 2-step random access type for a terminal;
    transmitting, to the terminal, a message including information on whether the PRACH occasions for the 4-step random access type is shared with the 2-step random access type;
    in case that the PRACH occasions for the 4-step random access type is shared with the 2-step random access type, receiving, from the terminal, a message A including a preamble based on a first configuration of PRACH occasions, wherein the first configuration of PRACH occasions is common for the 4-step random access type and the 2-step random access type; and
    in case that the PRACH occasions for the 4-step random access type is not shared with the 2-step random access type, receiving, from the terminal, a message A including a preamble based on a second configuration of PRACH occasions, wherein the second configuration of PRACH occasions is separately configured for the 2-step random access type.

5. The method of claim 4, wherein, in case that the PRACH occasions for the 4-step random access type is shared with the 2-step random access type, a preamble index of the preamble associated with a synchronization signal block (SSB) starts from an index which is determined based on a starting preamble index of preambles allocated for the 4-step random access type associated with the SSB and a total number of preambles for the 4-step random access type.

6. The method of claim 4, wherein the message further includes information indicating a subset of the PRACH occasions for the 4-step random access type shared with the 2-step random access type.

7. A terminal for a 2-step random access procedure in a wireless communication, the terminal comprising:
    a transceiver; and
    a controller coupled with the transceiver and configured to:
        receive, from a base station, a message including information on whether physical random access channel (PRACH) occasions for a 4-step random access type is shared with a 2-step random access type,
        identify whether the PRACH occasions for the 4-step random access type is shared with the 2-step random access type based on the message,
        in case that the PRACH occasions for the 4-step random access type is shared with the 2-step random access type, transmit, to the base station, a message A including a preamble based on a first configuration of PRACH occasions, wherein the first configuration of PRACH occasions is common for the 4-step random access type and the 2-step random access type, and
        in case that the PRACH occasions for the 4-step random access type is not shared with the 2-step random access type, transmit, to the base station, a message A including a preamble based on a second configuration of PRACH occasions, wherein the second configuration of PRACH occasions is separately configured for the 2-step random access type.

8. The terminal of claim 7, wherein, in case that the PRACH occasions for the 4-step random access type is shared with the 2-step random access type, a preamble index of the preamble associated with a synchronization signal block (SSB) starts from an index which is determined based on a starting preamble index of preambles allocated for the 4-step random access type associated with the SSB and a total number of preambles for the 4-step random access type.

9. The terminal of claim 7, wherein the message further includes information indicating a subset of the PRACH occasions for the 4-step random access type shared with the 2-step random access type.

10. A base station for a 2-step random access procedure in a wireless communication, the base station comprising:
   a transceiver; and
   a controller coupled with the transceiver and configured to:
      identify whether physical random access channel (PRACH) occasions for a 4-step random access type is shared with a 2-step random access type for a terminal,
      transmit, to the terminal, a message including information on whether the PRACH occasions for the 4-step random access type is shared with the 2-step random access type,
      in case that the PRACH occasions for the 4-step random access type is shared with the 2-step random access type, receive, from the terminal, a message A including a preamble based on a first configuration of PRACH occasions, wherein the first configuration of PRACH occasions is common for the 4-step random access type and the 2-step random access type, and
      in case that the PRACH occasions for the 4-step random access type is not shared with the 2-step random access type, receive, from the terminal, a message A including a preamble based on a second configuration of PRACH occasions, wherein the second configuration of PRACH occasions is separately configured for the 2-step random access type.

11. The base station of claim 10, wherein, in case that the PRACH occasions for the 4-step random access type is shared with the 2-step random access type, a preamble index of the preamble associated with a synchronization signal block (SSB) starts from an index which is determined based on a starting preamble index of preambles allocated for the 4-step random access type associated with the SSB and a total number of preambles for the 4-step random access type.

12. The base station of claim 10, wherein the message further includes information indicating a subset of the PRACH occasions for the 4-step random access type shared with the 2-step random access type.

\* \* \* \* \*